(12) United States Patent
Minoura et al.

(10) Patent No.: US 8,765,041 B2
(45) Date of Patent: Jul. 1, 2014

(54) WEATHER STRIP AND PRODUCTION METHOD THEREOF

(71) Applicant: Toyoda Gosei Co., Ltd., Kiyosu (JP)

(72) Inventors: Hideaki Minoura, Kiyosu (JP); Kazuhiro Takahashi, Kiyosu (JP); Yoshihisa Kubo, Kiyosu (JP); Tatsuya Kawai, Kiyosu (JP)

(73) Assignee: Toyoda Gosei Co., Ltd., Kiyosu-Shi, Aichi-Ken (JP)

( * ) Notice: Subject to any disclaimer, the term of this patent is extended or adjusted under 35 U.S.C. 154(b) by 0 days.

(21) Appl. No.: 13/939,456

(22) Filed: Jul. 11, 2013

(65) Prior Publication Data

US 2013/0292874 A1 Nov. 7, 2013

Related U.S. Application Data

(62) Division of application No. 13/064,417, filed on Mar. 23, 2011.

(51) Int. Cl.
*B29C 45/14* (2006.01)

(52) U.S. Cl.
USPC .......................................... 264/250; 264/261

(58) Field of Classification Search
USPC ........ 49/475.1, 479.1, 490.1, 498.1; 264/250, 264/255, 259, 297.2, 261, 279.2
See application file for complete search history.

(56) References Cited

U.S. PATENT DOCUMENTS

| | | | |
|---|---|---|---|
| 4,495,234 A | 1/1985 | Tominaga et al. | |
| 4,848,035 A | 7/1989 | Sakuma et al. | |
| 4,952,442 A | 8/1990 | Warner | |
| 4,986,947 A | 1/1991 | Shigeki et al. | |
| 5,099,612 A | 3/1992 | Hayashi et al. | |
| 5,258,157 A * | 11/1993 | Nozaki et al. | 264/261 |
| 5,538,578 A * | 7/1996 | Sugawara et al. | 156/245 |
| 5,776,403 A * | 7/1998 | Yada et al. | 264/259 |
| 6,247,271 B1 | 6/2001 | Fioritto et al. | |
| 6,548,143 B1 | 4/2003 | Heller | |

(Continued)

FOREIGN PATENT DOCUMENTS

| | | | |
|---|---|---|---|
| JP | 59-169929 A | 9/1984 | |
| JP | 3-32823 A | 2/1991 | |

(Continued)

OTHER PUBLICATIONS

Notification of Reason(s) for Refusal dated Sep. 6, 2012, with English translation.

(Continued)

*Primary Examiner* — Katherine Mitchell
*Assistant Examiner* — Justin Rephann
(74) *Attorney, Agent, or Firm* — McGinn IP Law Group, PLLC

(57) ABSTRACT

A method for producing a weather strip including an extrusion molded extrusion molded portion, an injection molded portion which is formed by a molding device having a plurality of mold members and connects both ends of the extrusion molded portions in a straight line shape, a mounting base portion which is mounted on a circumferential edge of an opening of a body or a circumferential edge of an opening/closing member for opening and closing the opening, and a hollow sealing portion which protrudes from the mounting base portion, and is pressed against an opposite member when the opening/closing member for opening and closing the opening is closed.

5 Claims, 30 Drawing Sheets

(56) References Cited

U.S. PATENT DOCUMENTS

| | | |
|---|---|---|
| 6,616,878 B2 | 9/2003 | Harada et al. |
| 7,306,839 B2 | 12/2007 | Kubo et al. |
| 7,363,749 B2 | 4/2008 | Sultan et al. |
| 7,582,243 B2 * | 9/2009 | Kubo et al. .................. 264/261 |
| 7,685,777 B2 | 3/2010 | Nozaki et al. |
| 7,740,466 B2 * | 6/2010 | Kubo .......................... 425/123 |
| 7,841,636 B2 | 11/2010 | Huth et al. |
| 8,205,391 B2 | 6/2012 | Aritake et al. |
| 8,286,389 B2 | 10/2012 | Lichtner et al. |
| 2001/0010856 A1 | 8/2001 | Teramoto et al. |
| 2002/0101002 A1 | 8/2002 | Harada et al. |
| 2002/0178656 A1 * | 12/2002 | Nozaki et al. .................. 49/441 |
| 2003/0157298 A1 * | 8/2003 | Kubo et al. .................. 428/122 |
| 2003/0188491 A1 | 10/2003 | Aritake |
| 2004/0247827 A1 * | 12/2004 | Kubo et al. .................. 428/136 |
| 2005/0022454 A1 | 2/2005 | Aida et al. |
| 2006/0005471 A1 | 1/2006 | Yamada et al. |
| 2006/0162257 A1 | 7/2006 | Nozaki et al. |
| 2008/0000165 A1 | 1/2008 | Ochiai |
| 2008/0148646 A1 | 6/2008 | Nozaki et al. |
| 2009/0252969 A1 * | 10/2009 | Tamura ........................ 428/409 |
| 2009/0266000 A1 | 10/2009 | Minoura et al. |
| 2010/0212230 A1 | 8/2010 | Ogilvie |
| 2011/0072729 A1 | 3/2011 | Otsuka et al. |
| 2011/0162285 A1 | 7/2011 | Lichtner et al. |
| 2011/0266716 A1 * | 11/2011 | Ho et al. ........................ 264/275 |
| 2013/0067821 A1 | 3/2013 | Otsuka et al. |
| 2013/0074416 A1 | 3/2013 | Cotnoir |

FOREIGN PATENT DOCUMENTS

| | | |
|---|---|---|
| JP | 3-38430 A | 2/1991 |
| JP | 4-146816 A | 5/1992 |
| JP | 5-75008 A | 3/1993 |
| JP | 6-210663 A | 8/1994 |
| JP | 7-164978 A | 6/1995 |
| JP | 9-174567 A | 7/1997 |
| JP | 2000-263649 A | 9/2000 |
| JP | 2001-97139 A | 4/2001 |
| JP | 2001-277863 A | 10/2001 |

OTHER PUBLICATIONS

Notification of Reason(s) for Refusal dated Mar. 18, 2013, with English translation.

* cited by examiner

WEATHER STRIP AND PRODUCTION METHOD THEREOF

The present application is a Divisional application of U.S. patent application Ser. No. 13/064,417, filed on Mar. 23, 2011.

BACKGROUND OF THE INVENTION

1. Field of the Invention

The present invention relates to a weather strip capable of sealing a gap between an opening of an automobile body or the like, and an opening/closing member for opening and closing the opening, and a production method thereof.

2. Related Art

Conventionally, a weather strip is installed at an edge portion of an opening which is formed in a body (automobile body) of an automobile or the like. The weather strip includes a trim portion of a substantially U-shaped cross section serving as a mounting base portion mounted on a flange portion which is provided along the edge portion of the opening, and a hollow sealing portion protruding from the trim portion and having a hollow portion. When an opening/closing member for opening and closing the opening is closed, a gap between the body and the opening/closing member is sealed by the pressing contact between the hollow sealing portion and the edge portion of the opening/closing member.

Such a kind of weather strip is formed in an annular shape or a further elongated shape by connecting ends of one or more extrusion molded portions, which are formed in an elongated shape by injection molding, side by side. That is, in a state in which the ends of the extrusion molded portions are supported and fixed in a molding device, an injection molded portion is formed between the ands by injection molding, so that the ends are connected to each other to form the weather strip of the annular shape or elongated shape.

In a weather strip having the hollow sealing portion, as described above, it is necessary to dispose a core mold for forming the hollow portion in a cavity of the molding device, at the time of forming the injection molded portion. The core mold includes a core body for forming the hollow portion, and a holding portion protruding outwardly from the core body. The core body is mostly enclosed by an elastic material such as rubber, but after formation of the injection molded portion, it is necessary to withdraw the core body from the hollow sealing portion of a molding product.

For this reason, the related art necessitates that the hollow sealing portion in the vicinity of the end of the extrusion molded portion be provided with an opening, through which the core body is withdrawn, that is, "core withdrawing hole" (for example, refer to JP-UM-A-59-169929). In such a configuration, a process of forming the core withdrawing hole is required before the injection molded portion is formed. In addition, the core body is disposed via the core withdrawing hole therebetween, and then the other end of the hollow sealing portion of the extrusion molded portion is to be inserted into a front end of the core body. Therefore, there may be a problem in that if the front end of the core body is formed in a taper shape in view of ease of insertion, an insertion margin and a width of the injection molded portion are widened thereby lowering the productivity or increasing the cost.

In contrast, a technique or the like, in which the ends of the extrusion molded portions face each other across a sheet material serving as an adhering member, and are bonded to each other by thermal processing, is proposed (for example, refer to JP-A-2000-263649). Such a configuration can reduce the width dimension of a connecting portion, but since the hollow portion is clogged in the connecting portion, a load may be locally increased in the vicinity of the connecting portion when the opening/closing member is closed. In addition, it is necessary to accurately perform the length adjustment of the extrusion molded portion or the positioning of the end in accordance with the thickness of the sheet material. Further, since a groove of the trim portion or the like is clogged, a process of cutting the sheet material after the bonding process is inevitable. Therefore, a problem such as a decrease in productivity or an increase in cost may occur. In addition, a stepped portion is likely to form between the extrusion molded portion and the connecting portion, and there is a fear of a reduction of sealing capability.

As a technique capable of suppressing the decrease in productivity or the increase in cost as compared with the related arts, a technique of providing a core withdrawing hole in a region of the injection molded portion is also disclosed (for example, JP-A-7-164978).

However, in the weather strip disclosed in JP-A-7-164978, since the width (connecting width) of the injection molded portion in the longitudinal direction of the weather strip is relatively long, and the opening, which is used as an air discharging hole, as well as the core withdrawing hole, formed in the injection molded portion has a relatively large opening area, there is a concern that it may look unattractive, and the quality of the appearance is deteriorated.

In addition, since the large opening is formed in the injection molded portion, there is a concern that a load difference may be increased between the injection molded portion and the extrusion molded portion in the vicinity of the injection molded portion when the opening/closing member is closed, the sealing capability is deteriorated.

Further, in order to prevent the load difference from being increased, the weather strip disclosed in JP-A-7-164978 is provided with a support lip for supporting the hollow sealing portion and closing the opening when the opening/closing member is closed. If such a support lip is provided, it may be difficult to carry out the core withdrawing operation.

In a case where the hollow sealing portion exists at a lateral surface of the trim portion, as the present invention, and a portion of the hollow sealing portion forms a sidewall of the trim portion, a portion of the core body which is provided in the hollow sealing portion forms the sidewall of the trim portion, and the trim portion is formed to have a thickness sufficient to maintain the shape thereof. Therefore, since the working of withdrawing the core body depends only on the deformation of the sealing wall side of the hollow sealing portion, it is difficult to carry out the core withdrawing operation.

SUMMARY OF THE INVENTION

The present invention is made to solve the above-described problems, and an object of the present invention is to provide a weather strip having a good quality of appearance and preventing a sealing capability from being deteriorated. In addition, another object of the present invention is to provide a method of producing a weather strip which can withdrawn a core mold from a relatively narrow width in a region of an injection molded portion, when the weather strip having an extrusion molded portion connected to the injection molded portion is produced, without causing a decrease in the quality of the appearance of the weather strip or a sealing capability thereof.

Each configuration suitable for solving the above-described problems will now be classified by item and described. In addition, a specific operation effect of the corresponding configuration or the like will be described, as necessary.

Configuration 1. A weather strip including: an extrusion-molded extrusion molded portion (extrusion molded general portion); an injection molded portion (injection molded connecting portion) which connects both ends of the extrusion molded portions in a straight line shape; a mounting base portion which is mounted on a circumferential edge of an opening of a body or a circumferential edge of an opening/closing member for opening and closing the opening; and a hollow sealing portion which protrudes from the mounting base portion, and is pressed against an opposite member when the opening/closing member for opening and closing the opening is closed, wherein the injection molded portion is formed such that a width (connecting width) thereof in a longitudinal direction of the weather strip is 0.5 mm or more and 3.0 mm or less, the hollow sealing portion is provided with a core withdrawing hole, through which a core mold member forming an inner peripheral surface of the hollow sealing portion is withdrawn after formation, and the core withdrawing hole is formed such that a length thereof along a circumferential direction of the inner peripheral surface of the hollow sealing portion is 25% or more and 45% or less of a circumferential length of the inner peripheral surface in a region of the hollow sealing portion except for a sealing surface which is pressed against the opposite member.

According to Configuration 1 above, the injection molded portion itself (a relatively narrow width within a region of the injection molded portion) is provided with the core withdrawing hole, through which the core mold member, which is used to form the hollow sealing portion of the injection molded portion after the core mold member is formed, is withdrawn. That is, in the present configuration, since the connecting width of the injection molded portion of 0.5 mm or more and 3.0 mm or less is relatively narrow, and an opening area of the opened core withdrawing hole is relatively small, the injection molded portion and the core withdrawing hole hardly stick out. As a result, it looks highly attractive, and the quality of the appearance is improved.

If the connecting width of the injection molded portion is set to less than 0.5 mm, a holding portion for supporting the core body of the core mold member needs to be very thin, and it is difficult to obtain the strength of the core mold member, such that the durability of the mold may be deteriorated. Meanwhile, if the connecting width of the injection molded portion is more than 3.0 mm, it will look unattractive.

In addition, the core withdrawing hole of the present configuration is formed such that the length thereof along the circumferential direction of the inner peripheral surface of the hollow sealing portion is 25% or more and 45% or less of the circumferential length of the inner peripheral surface. In addition, considering that the circumferential length of the inner peripheral surface (outer circumferential surface of the core body) of the hollow sealing portion of a common weather strip is 30 mm to 50 mm, even though the core withdrawing hole is provided in the overall area (3.0 mm at its maximum) of the connecting width of the injection molded portion, the core withdrawing hole of the present configuration is long in the circumferential direction of the hollow sealing portion rather than the longitudinal direction of the weather strip. In addition, a process of forming the core withdrawing hole in advance in the extrusion molded portion is not necessary. Further, it is not necessary to use a sheet material or the like specially for connecting the extrusion molded portion, as described in the Background Art. As a result, it is possible to suppress the decrease in productivity or the increase in cost.

Moreover, since the hollow sealing portion is not clogged by the sheet material, there is no concern that a load applied when the opening/closing member is closed may be locally increased in the vicinity of the connecting portion. Further, a stepped portion hardly forms between the injection molded portion and the extrusion molded portion, and it is possible to suppress the decrease in the sealing capability.

In addition, according to the present configuration, even though there is no support lip for closing the core withdrawing hole while supporting the hollow sealing portion when the opening/closing member is closed, as those disclosed in the Background Art, a load difference applied when the opening/closing member is closed is not increased between the injection molded portion and the extrusion molded portion in the vicinity of the injection molded portion.

As a result, according to the present configuration, it does not lead to a decrease in the sealing capability of the weather strip or the quality of the appearance.

Configuration 2. The weather strip according to Configuration 1 above, wherein the mounting base portion is a trim portion of a substantially U-shaped cross section which is mounted along the circumferential edge of the opening of the body, and has an outer-peripheral-side sidewall portion, an inner-peripheral-side sidewall portion, and a connecting portion for connecting both sidewall portions, and the hollow sealing portion protrudes from the connecting portion, and has a sealing wall which is pressed against the peripheral portion of the opening/closing member when the opening/closing member for opening and closing the opening is closed, the core withdrawing hole, and a front end lip provided in the vicinity of the core withdrawing hole.

According to Configuration 2 above, since the mounting base portion is provided with the trim portion of the substantially U-shaped cross section, the mounting base portion can be easily mounted on a flange portion. In addition, since the hollow sealing portion has the front end lip, it can extend a sealing surface of the opposite member and can conceal slightly the core withdrawing hole. Even though the core withdrawing hole is present in the injection molded portion, it is possible to prevent the decrease in the sealing capability of the weather strip or the quality of the appearance.

Configuration 3. The weather strip according to Configuration 1 or 2 above, wherein the injection molded portion is made of relatively soft olefin-based thermoplastic elastomer (TPV) of 40 IRHD in the overall portion including the mounting base portion and the hollow sealing portion.

According to Configuration 3 above, it is possible to equalize a repulsive force of the hollow sealing portion of the injection molded portion and a repulsive force of the hollow sealing portion of the extrusion molded portion and to prevent the sealing capability from being deteriorated. In addition, since the stiffness of the mounting base portion of the injection molded portion is lower than that of the extrusion molded portion, it is considered that the mounting stability worsens. However, since the injection molded portion is a short region with respect to the longitudinal direction of the weather strip, both adjacent extrusion molded portions assist the stiffness of the mounting base portion, so that the mounting stability is not deteriorated even though it is made of the soft TPV.

In addition, since the overall portion of the injection molded portion can be made of a single material (soft TPV) in accordance with the stiffness of the hollow sealing portion, it is possible to carry out the molding easily and inexpensively compared with two-color molding according to the stiffness of each part.

Configuration 4. The weather strip according to Configuration 1 above, wherein the weather strip includes a trim portion which is mounted on a circumferential edge of a door opening of the body, and a hollow sealing portion which protrudes from a vehicle outer sidewall portion of the trim portion, and is pressed against the circumferential edge of a door when the door for opening and closing the door opening is closed, and the core withdrawing hole of the hollow sealing portion is formed such that the length thereof along the circumferential direction of the inner peripheral surface of the hollow sealing portion is 25% or more and 45% or less of the circumferential length of the inner peripheral surface in the region of the hollow sealing portion except for the sealing surface which is pressed against the circumferential edge of the door.

According to Configuration 4 above, the injection molded portion itself (a relatively narrow width within a region of the injection molded portion) is provided with the core withdrawing hole, through which the core mold member, which is used to form the hollow sealing portion of the injection molded portion after the core mold member is formed, is withdrawn. That is, in the present configuration, since the connecting width of 0.5 mm or more and 3.0 mm or less of the injection molded portion is relatively narrow, and an opening area of the opened core withdrawing hole is relatively small, the injection molded portion and the core withdrawing hole hardly stick out. As a result, it looks highly attractive, and the quality of the appearance is improved.

If the connecting width of the injection molded portion is set to less than 0.5 mm, a holding portion for supporting the core body of the core mold member needs to be very thin, and it is difficult to obtain the strength of the core mold member, such that the durability of the mold may be deteriorated. Meanwhile, if the connecting width of the injection molded portion is 3.0 mm or more, it will look unattractive.

In addition, the core withdrawing hole of the present configuration is formed such that the length thereof along the circumferential direction of the inner peripheral surface of the hollow sealing portion is 25% or more and 45% or less of the circumferential length of the inner peripheral surface. In addition, considering that the circumferential length of the inner peripheral surface (outer circumferential surface of the core body) of the hollow sealing portion of a common weather strip is 30 mm to 50 mm, even though the core withdrawing hole is provided in the overall area (3.0 mm at its maximum) of the connecting width of the injection molded portion, the core withdrawing hole of the present configuration is long in the circumferential direction of the hollow sealing portion rather than the longitudinal direction of the weather strip. In addition, a process of forming the core withdrawing hole in advance in the extrusion molded portion is not necessary. Further, it is not necessary to use a sheet material or the like specially for connecting the extrusion molded portion, as described in the Background Art. As a result, it is possible to suppress the decrease in productivity or the increase in cost.

Moreover, since the hollow sealing portion is not clogged by the sheet material, there is no concern that a load applied when the door is closed may be locally increased in the vicinity of the connecting portion. Further, a stepped portion is hardly formed between the injection molded portion and the extrusion molded portion, and it is possible to suppress the decrease in the sealing capability.

In addition, according to the present configuration, even though there is no support lip for closing the core withdrawing hole while supporting the hollow sealing portion when the door is closed, as those disclosed in the Background Art, a load difference applied when the door is closed is not increased between the injection molded portion and the extrusion molded portion in the vicinity of the injection molded portion.

As a result, according to the present configuration, it does not lead to the decrease in the sealing capability of the weather strip or the quality of the appearance.

Configuration 5. The weather strip according to Configuration 4 above, wherein the injection molded portion is provided such that it is positioned at a lower edge portion of the door opening.

According to Construction 5, the injection molded portion and the core withdrawing hole hardly stick out. As a result, it can improve the quality of the new appearance. In the configuration in which a scuff plate or the like is mounted onto the lower edge portion of the door opening to cover the weather strip, the operation effect thereof is further improved.

In addition, in the case where the injection molded portion is provided such that it is positioned at the lower edge portion of the door opening, in order to prevent water from being gathered in the hollow sealing portion, in addition to the increased quality of the appearance, it is desirable that the core withdrawing hole is formed in the portion positioned lower than the sealing surface in the state in which the trim portion is mounted on the circumferential edge of the door opening.

Configuration 6. The weather strip according to Configuration 4 or 5 above, wherein the injection molded portion is made of relatively soft olefin-based thermoplastic elastomer (TPV) of 40 IRHD in the overall portion including the trim portion and the hollow sealing portion.

According to Configuration 6 above, it is possible to equalize the repulsive force of the hollow sealing portion of the injection molded portion and the repulsive force of the hollow sealing portion of the extrusion molded portion, and prevent the sealing capability from being deteriorated. In addition, since the stiffness of the trim portion of the injection molded portion is lower than that of the extrusion molded portion, it is considered that the mounting stability worsens. However, since the injection molded portion is a short region with respect to the longitudinal direction of the weather strip, both adjacent extrusion molded portions assist the stiffness of the trim portion, so that the mounting stability is not deteriorated even though it is made of the soft TPV.

In addition, since the overall portion of the injection molded portion can be made of a single material (soft TPV) in accordance with the stiffness of the hollow sealing portion, it is possible to carry out the molding easily and inexpensively as compared with two-color molding according to the stiffness of each part.

Configuration 7. The weather strip according to Configuration 1 above, wherein the weather strip includes a mounting base portion which is mounted on a circumferential edge of a movable loop for opening and closing a loop panel opening of a body, and a hollow sealing portion which protrudes from the mounting base portion, and has a sealing wall which is pressed against the circumferential edge of the loop panel opening when the movable loop is closed, and the core withdrawing hole of the hollow sealing portion is formed such that a length thereof along a circumferential direction of the inner peripheral surface of the hollow sealing portion is 15% or more and 45% or less of a circumferential length of the inner peripheral surface in a region of the hollow sealing portion except for a sealing surface which is pressed against the circumferential edge of the loop panel opening.

According to Configuration 7 above, the injection molded portion itself (a relatively narrow width within a region of the injection molded portion) is provided with the core withdrawing hole, through which the core mold member, which is used to form the hollow sealing portion of the injection molded portion after the core mold member is formed, is withdrawn. That is, in the present configuration, since the connecting width of 0.5 mm or more and 3.0 mm or less of the injection molded portion is relatively narrow, and an opening area of the opened core withdrawing hole is relatively small, the injection molded portion and the core withdrawing hole hardly stick out. As a result, it looks highly attractive, and the quality of the appearance is improved.

If the connecting width of the injection molded portion is set to less than 0.5 mm, a holding portion for supporting the core body of the core mold member needs to be very thin, and it is difficult to obtain the strength of the core mold member, such that the durability of the mold may be deteriorated. Meanwhile, if the connecting width of the injection molded portion is 3.0 mm or more, it will look unattractive.

In addition, the core withdrawing hole of the present configuration is formed such that the length thereof along the circumferential direction of the inner peripheral surface of the hollow sealing portion is 15% or more and 45% or less of the circumferential length of the inner peripheral surface. More preferably, the core withdrawing hole is formed such that the length thereof is 25% or more and 45% or less. In addition, considering that the circumferential length of the inner peripheral surface (outer circumferential surface of the core body) of the hollow sealing portion of a common weather strip is 30 mm to 50 mm, even though the core withdrawing hole is provided in the overall area (3.0 mm at its maximum) of the connecting width of the injection molded portion, the core withdrawing hole of the present configuration is long in the circumferential direction of the hollow sealing portion rather than the longitudinal direction of the weather strip. In addition, a process of forming the core withdrawing hole in advance in the extrusion molded portion is not necessary. Further, it is not necessary to use a sheet material or the like specially for connecting the extrusion molded portion, as described in the Background Art. As a result, it is possible to suppress the decrease in productivity or the increase in cost.

Moreover, since the hollow sealing portion is not clogged by the sheet material, there is no concern that a load applied when the movable loop is closed may be locally increased in the vicinity of the connecting portion. Further, a stepped portion is hardly formed between the injection molded portion and the extrusion molded portion, and it is possible to suppress the decrease in the sealing capability.

In addition, according to the present configuration, even though there is no support lip for closing the core withdrawing hole while supporting the hollow sealing portion when the movable loop is closed, as those disclosed in the Background Art, a load difference applied when the movable loop is closed is not increased between the injection molded portion and the extrusion molded portion in the vicinity of the injection molded portion.

As a result, according to the present configuration, it does not lead to the decrease in the sealing capability of the weather strip or the quality of the appearance.

Configuration 8. The weather strip according to Configuration 7 above, wherein the mounting base portion is mounted along the circumferential edge of the movable loop, is formed in a substantially U-shaped cross section, and has an outer-peripheral-side sidewall portion, an inner-peripheral-side sidewall portion, and a connecting portion for connecting both sidewall portions, and the mounting base portion has an extension base portion which extends at an angle from an end of the outer-peripheral-side sidewall portions to form a portion of the hollow sealing portion with the sealing wall, or a dewatering lip which extends at an angle outwardly from the sealing wall or extending immediately under the sealing wall, and the core withdrawing hole is provided at a position of either of the sealing wall or the extension base portion which is adjacent to the dewatering lip.

According to Configuration 8, since the mounting base portion is formed in the substantially U-shaped cross section, it is possible to easily mount the mounting base portion on the flange portion. In addition, since the core withdrawing hole is provided at the position adjacent to the dewatering lip, it is possible to discharge the water along the dewatering lip without leaving the water in the hollow portion. In the case where the core withdrawing hole is provided in the extension base portion, the core withdrawing hole can be concealed thereby to prevent the decrease in the sealing capability of the weather strip or the quality of appearance even though the core withdrawing hole is present in the injection molded portion.

Configuration 9. A method for producing a weather strip including an extrusion-molded extrusion molded portion; an injection molded portion which is formed by a molding device having a plurality of mold members and connects both ends of the extrusion molded portions in a straight line shape; a mounting base portion which is mounted on a circumferential edge of an opening of a body or a circumferential edge of an opening/closing member for opening and closing the opening; and a hollow sealing portion which protrudes from the mounting base portion, and is pressed against an opposite member when the opening/closing member for opening and closing the opening is closed, wherein in a core mold member having a core body for forming an inner peripheral surface of a hollow sealing portion of the injection molded portion, and a holding portion protruding from the core body, in a state in which both ends of the core body are inserted into a terminal of the hollow sealing portion of the extrusion molded portion when the injection molded portion is formed, the core mold member is positioned at a predetermined position of the molding device such that a connecting width of the injection molded portion in a longitudinal direction of the weather strip is 0.5 mm or more and 3.0 mm or less, the mold member is closed to form a cavity in the molding device, and the cavity is filled with a material of the injection molded portion to form the injection molded portion; the injection molded portion is provided with a core withdrawing hole, through which the core body is withdrawn by at least the holding portion after the core body is formed, such that a length thereof along a circumferential direction of the inner peripheral surface of the hollow sealing portion is 25% or more and 45% or less of a circumferential length of the inner peripheral surface in a region of the hollow sealing portion except for a sealing surface which is pressed against the opposite member; and after the injection molded portion is formed and the mold member of the molding device is opened, the core body is withdrawn from the core withdrawing hole.

According to Configuration 9 above, the same operation effects as those of Configuration 1 above are achieved. In addition, as the width of the core withdrawing hole is set to be relatively narrow of 3.0 mm at its maximum with respect to the longitudinal direction of the weather strip in the present configuration, it is necessary to secure the length of the core withdrawing hole to a certain extent with respect to the circumferential direction of the hollow sealing portion. While the length of the core withdrawing hole depends upon the length of the core body with respect to the longitudinal direction of the weather strip, in order to carry out the core withdrawing operation of the core body for forming the hollow sealing portion having a width of 3.0 mm at its maximum, it is desirable that the length of the core withdrawing hole along the circumferential direction of the inner peripheral surface of the hollow sealing portion is 25% or more of the circumferential length of the inner peripheral surface (outer peripheral surface of the core body) of the hollow sealing portion to a minimum. If the length of the core withdrawing hole is less than 25% of the circumferential length of the inner peripheral surface of the hollow sealing portion, there is a concern that the core mold member may not be easily withdrawn, and the circumferential edge of the core withdrawing hole may be broken.

In contrast, if the length of the core withdrawing hole with respect to the circumferential direction of the hollow sealing portion is too long, it is difficult to secure the sealing surface or prevent the water from entering. For this reason, it is desirable that the length of the core withdrawing hole with respect to the circumferential direction of the hollow sealing portion is set to be 45% or less of the circumferential length of the inner peripheral surface of the hollow sealing portion.

Configuration 10. The method for producing the weather strip according to Configuration 9 above, wherein among the plurality of mold members, a predetermined mold member opposite the outer peripheral surface of the core body is provided with a locking protrusion for locking the extrusion molded portion which is inserted into the core body.

According to Configuration 10 above, even though the extrusion molded portion is not held over the relatively wide region in the longitudinal direction of the extrusion molded portion, since the locking protrusion is provided thereby to sufficiently hold the extrusion molded portion, it is possible to reduce the concern that the extrusion molded portion may be deviated from the core body by an ejection pressure when the material is extruded into the cavity. Therefore, since the quantity of the core body inserted into the extrusion molded portion can be reduced, it is possible to shorten the length of the core body, and thus to form the core withdrawing hole with a relatively small size. As a result, the core withdrawing operation can be easily carried out, and it is possible to improve productivity and the quality of the appearance.

In addition, the core body can be provided with the locking protrusion. However, since the core body gets bigger, and it is difficult to carry out the inserting and withdrawing operation of the core body, it is desirable that only the mold member opposite to the core body is provided with the locking protrusion.

Configuration 11. The method for producing the weather strip according to Configuration 9 or 10 above, wherein olefin-based thermoplastic elastomer (TPV) of 40 IRHD is used as the material of the injection molded portion.

According to Configuration 11 above, the same operation effect as that of Configuration 3 above is achieved. In addition, when the injection molded portion is generally formed, both ends of the core body are inserted into the ends of the hollow sealing portion of the extrusion molded portion, and then is set in the molding device, the material is supplied into the cavity of the molding device. In order to prevent the extrusion molded portion from being deviated from the core body due to the ejection pressure, the end of the extrusion molded portion is generally held between the core body and the predetermined mold member. However, since sponge rubber material, such as EPDM, conventionally used as the material of the injection molded portion has relatively high viscosity, and thus it is required to eject the material at high pressure, the extrusion molded portion is necessarily held over the wide region in the longitudinal direction. That is, as a large quantity of the core body inserted into both ends of the extrusion molded portion is required, the length of the core body itself, and the length of the core withdrawing hole, through which the core body is withdrawn, is possibly extended in the longitudinal direction of the weather strip. In addition, since the rubber material such as EPDM is required to be vulcanized by applying a high level of heat to the mold member, there is a concern that a trace may be left on the end of the extrusion molded portion which is pressed down by the mold member.

In contrast, according to the present configuration, since the material of the injection molded portion is the TPV which has a viscosity lower than that of the EPDM or the like and does not require vulcanization, there is little concern that the end of the extrusion molded portion may be deviated from the core body by the ejection pressure of the material. As a result, it is possible to shorten the region for holding the extrusion molded portion, easily carry out the core withdrawing operation, improve productivity, and improve the quality of the appearance.

In addition, by using the TPV, it is possible to eliminate the vulcanizing process and improve the productivity, and there is no trace on the extrusion molded portion. Further, as compared with the case of using the rubber material, the circumferential edge of the core withdrawing hole is hardly broken during the core withdrawing operation.

Moreover, as Configuration 10 above, in the case where the outer peripheral surface of the extrusion molded portion is locked by the locking protrusion, the trace is hardly left, so that the operation effect is good.

Configuration 12. The method for producing the weather strip according to any one of Configurations 9 to 11 above, wherein the injection molded portion is disposed such that a predetermined mold member among the plurality of mold members abuts one side of the holding portion in the circumferential direction of the hollow sealing portion and also abuts the core body, and after the cavity is filled with the material, the predetermined mold member is relatively spaced apart from the core mold member to form a portion of the core withdrawing hole.

According to Configuration 12, a portion of the core withdrawing hole is formed by the predetermined mold member abutting the core mold member, as well as the holding portion of the core mold member. That is, the core withdrawing hole is formed to be longer than a width of the holding portion in the circumferential direction of the hollow sealing portion. In this way, since the core withdrawing hole is opened yet more widely with respect to the longitudinal direction of the weather strip, it is possible to easily carry out the core withdrawing operation.

Configuration 13. The method for producing the weather strip according to Configuration 9 above, wherein the weather strip includes a trim portion which is mounted on a circumferential edge of a door opening of the body, and a hollow sealing portion which protrudes from a vehicle outer sidewall portion of the trim portion, and is pressed against the circumferential edge of the door when the door for opening and closing the door opening is closed, and at the time of molding the injection molded portion, the core withdrawing hole, through which the core body is withdrawn by at least the holding portion after the molding, is formed such that the length thereof along the circumferential direction of the inner peripheral surface of the hollow sealing portion is 25% or more and 45% or less of the circumferential length of the inner peripheral surface in the region of the hollow sealing portion except for the sealing surface which is pressed against the circumferential edge of the door.

According to Configuration 13 above, the same operation effect as that of Configuration 4 above is achieved. In addition, as the width of 3.0 mm of the core withdrawing hole is set to be relatively narrow at its maximum with respect to the longitudinal direction of the weather strip in the present configuration, it is necessary to secure the length of the core withdrawing hole to a certain extent with respect to the circumferential direction of the hollow sealing portion. While the length of the core withdrawing hole depends upon the length of the core body with respect to the longitudinal direction of the weather strip, in order to carry out the core withdrawing operation of the core body for forming the hollow sealing portion having a width of 3.0 mm at its maximum, it is desirable that the length of the core withdrawing hole along the circumferential direction of the inner peripheral surface of the hollow sealing portion is at least 25% or more of the circumferential length of the inner peripheral surface (outer peripheral surface of the core body) of the hollow sealing portion. If the length of the core withdrawing hole is less than 25% of the circumferential length of the inner peripheral surface of the hollow sealing portion, there is a concern that the core mold member may not be easily withdrawn, and the circumferential edge of the core withdrawing hole may be broken.

In contrast, if the length of the core withdrawing hole with respect to the circumferential direction of the hollow sealing portion is too long, it is difficult to secure the sealing surface or prevent the water from entering. For this reason, it is desirable that the length of the core withdrawing hole with respect to the circumferential direction of the hollow sealing portion is set to be 45% or less of the circumferential length of the inner peripheral surface of the hollow sealing portion.

Configuration 14. The method for producing the weather strip according to Configuration 9 above, wherein the weather strip includes a mounting base portion which is mounted on a circumferential edge of a movable loop for opening and closing a loop panel opening of the body, and a hollow sealing portion which protrudes from the mounting base portion, and has a sealing wall which is pressed against the circumferential edge of the loop panel opening when the movable loop is closed, and at the time of molding the injection molded portion, the core withdrawing hole, through which the core body is withdrawn by at least the holding portion after the molding, is formed such that the length thereof along the circumferential direction of the inner peripheral surface of the hollow sealing portion is 15% or more and 45% or less of the circumferential length of the inner peripheral surface in the region of the hollow sealing portion except for the sealing surface of the sealing wall which is pressed against the circumferential edge of the loop panel opening.

According to Configuration 14 above, the same operation effect as that of Configuration 7 above is achieved. In addition, as the width of 3.0 mm of the core withdrawing hole is set to be relatively narrow at its maximum with respect to the longitudinal direction of the weather strip in the present configuration, it is necessary to secure the length of the core withdrawing hole to a certain extent with respect to the circumferential direction of the hollow sealing portion. While the length of the core withdrawing hole depends upon the length of the core body with respect to the longitudinal direction of the weather strip, in order to carry out the core withdrawing operation of the core body for forming the hollow sealing portion having a width of 3.0 mm at its maximum, it is desirable that the length of the core withdrawing hole along the circumferential direction of the inner peripheral surface of the hollow sealing portion is 15% or more of the circumferential length of the inner peripheral surface (outer peripheral surface of the core body) of the hollow sealing portion. In addition, in the case where the sealing wall is provided with the core withdrawing hole, it is more desirable that the length of the core withdrawing hole is 25% or more. If the length of the core withdrawing hole is less than 15% of the circumferential length of the inner peripheral surface of the hollow sealing portion, there is a concern that the core mold member may not be easily withdrawn, and the circumferential edge of the core withdrawing hole may be broken.

In contrast, if the length of the core withdrawing hole with respect to the circumferential direction of the hollow sealing portion is too long, it is difficult to secure the sealing surface or prevent the water from entering. For this reason, it is desirable that the length of the core withdrawing hole with respect to the circumferential direction of the hollow sealing portion is set to be 45% or less of the circumferential length of the inner peripheral surface of the hollow sealing portion. In addition, in the case where the sealing wall is provided with the core withdrawing hole, it is more desirable that the length of the core withdrawing hole is 40% or less.

DETAILED DESCRIPTION OF THE PREFERRED EMBODIMENTS

First Embodiment

Figure 1:
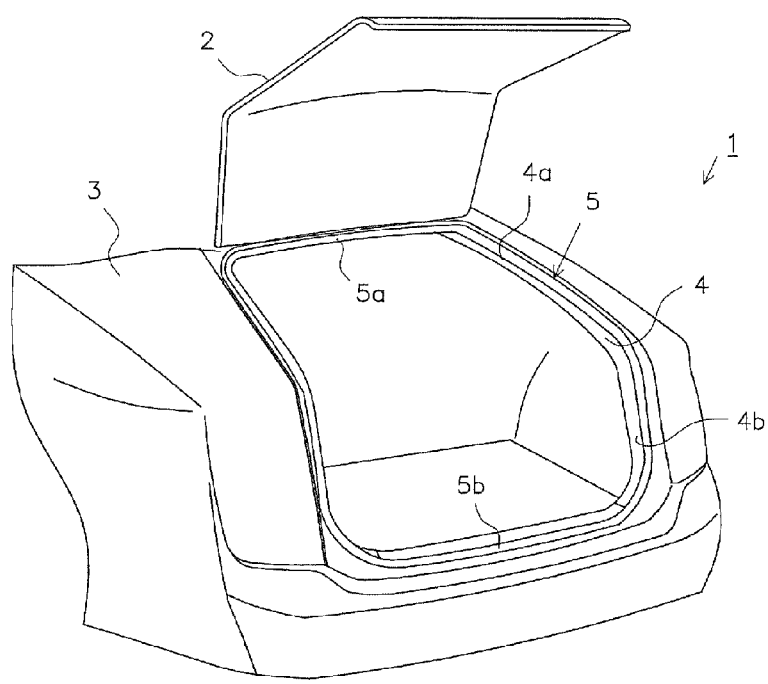
FIG. 1 is a perspective view illustrating a luggage compartment or the like of an automobile.

A first embodiment will now be described with reference to the accompanying drawings. As shown in FIG. 1, an automobile 1 serving as an automobile vehicle is provided with a luggage compartment door 2 serving as an opening/closing member for opening and closing an opening 4 of a luggage compartment which is formed in a body 3 serving as an automobile body. In addition, a circumferential edge of the opening 4 is provided with a weather strip 5 for sealing a gap between the luggage compartment door 2 and a circumferential edge of the opening 4 when the luggage compartment door 2 is closed.

Figure 2:
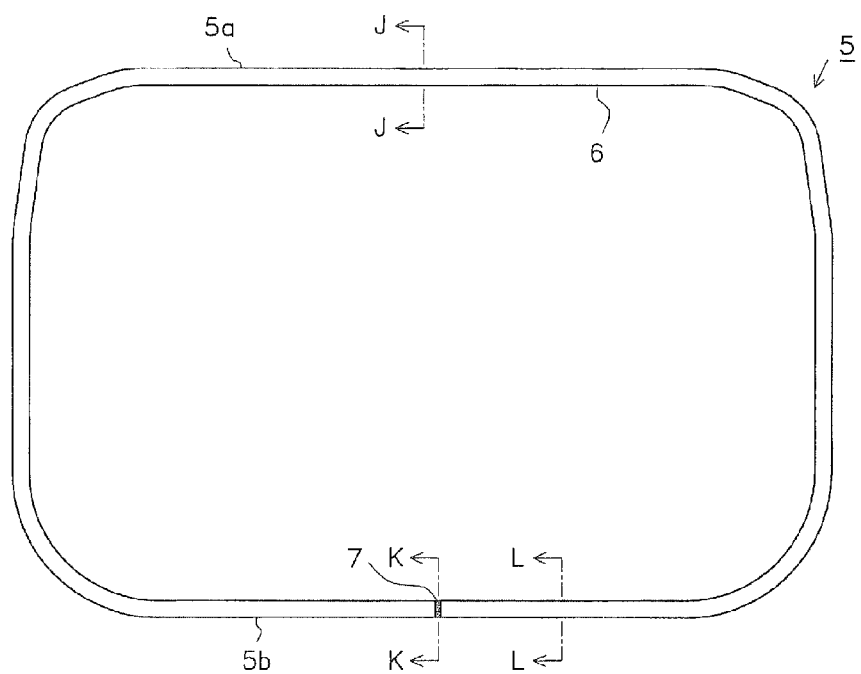
FIG. 2 is a front view of a weather strip according to the present invention.

As shown in FIG. 2, the weather strip 5 according to the first embodiment includes an extrusion molded portion 6 formed in the shape of a substantially straight line by injection molding, and an injection molded portion 7 (portion indicated by a scatter plot shape in FIGS. 2 and 5) for connecting both ends of the extrusion molded portions 6 in the shape of a straight line, and is formed in an annular shape in general.

Figure 3:
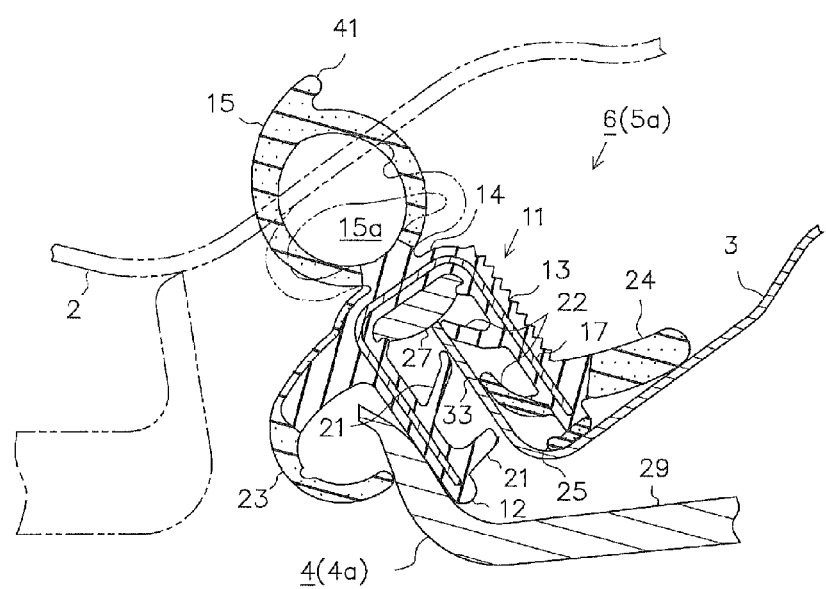
FIG. 3 is a cross-sectional view taken along the line J-J in FIG. 2 to illustrating a weather strip according to the present invention.

As shown in FIG. 3, the extrusion molded portion 6 includes a trim portion 11 of a substantially U-shaped cross section having an inner-peripheral-side sidewall portion 12, an outer-peripheral-side sidewall portion 13, a connecting portion 14 for connecting both sidewall portions 12 and 13, and a hollow sealing portion 15 protruding automobile-outwardly (upper left side in FIG. 3) from the connecting portion 14 and having a hollow portion 15a therein. In addition, a front end portion (top portion) of the hollow sealing portion 15 in a protruding direction thereof is provided with a front end lip 41 extending toward a vehicle outer side and an outer peripheral side (upper right side in FIG. 3) of the opening 4.

Further, the trim portion 11 of the extrusion molded portion 6 is embedded with a metallic insert 17 along a longitudinal direction thereof.

The circumferential edge of the opening 4 is provided with a flange portion 33 by bending and returning a panel, which constitutes the body 3, in the vehicle outer side. By relatively fitting the flange portion 33 into the trim portion 11, the weather strip 5 is mounted on the circumferential edge of the opening 4. In addition, when the luggage compartment door 2 is closed, the hollow sealing portion 15 is pressed against the circumferential edge of the luggage compartment door 2 at the portion including the front end lip 41, and thus is distorted and deformed (refer to the chain double-dashed line in FIG. 3), so that the gap between the luggage compartment door 2 and the body 3 is sealed.

As shown in FIG. 1, a rear ceiling portion of the automobile 1 according to the first embodiment is slanted downwards toward the rear. The luggage compartment provided at the rear of the automobile 1 includes a portion obliquely opened toward the upper portion in accordance with the shape of the ceiling portion, and a portion opened at the rear so as to easily take luggage in and out. That is, the opening 4 has an upper edge portion extending in a width direction of a vehicle, lateral edge portions extending rearward and downward at a slant from both ends of the upper edge portion, vertical edge portions extending downward from a rear end portion of each lateral edge portion, and lower edge portion extending to connect lower end portions of both vertical edge portions. In the first embodiment, the vertical edge portions do not extend at a right angle, but extend rearward at a slight slant toward the rear. In the opening 4, the portion enclosed by the upper edge portion and both lateral edge portions is referred to as an upper opening surface 4a, and the portion enclosed by the lower edge portion and both vertical edge portions is referred to as a lower opening surface 4b.

Figure 4:
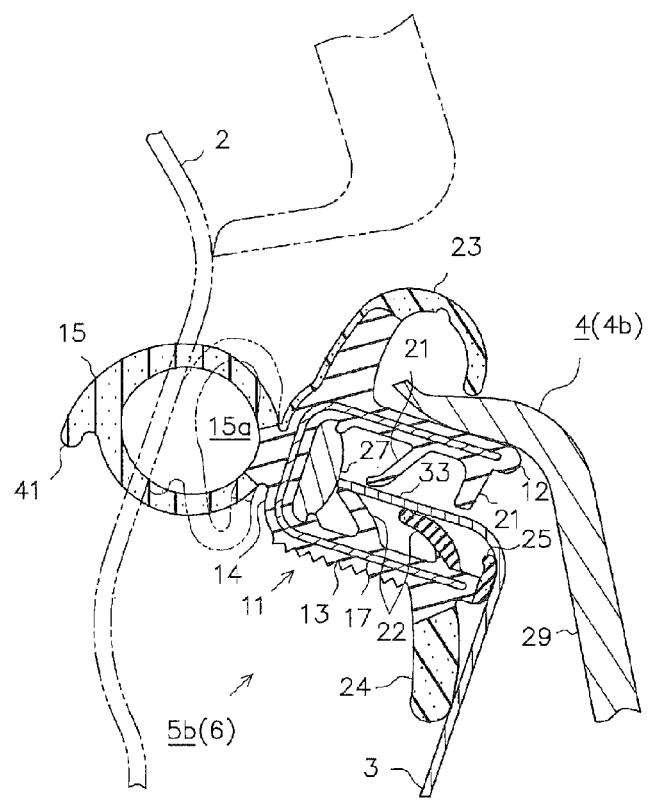
FIG. 4 is a cross-sectional view taken along the line L-L in FIG. 2 to illustrating a weather strip according to the present invention.

In addition, the flange portion 33 formed along the circumferential edge of the opening 4 extends vertically with respect to the corresponding opening surfaces 4a and 4b toward the outward side of the vehicle. More specifically, the portion of the flange portion 33 corresponding to the upper edge portion of the opening 4 extends in a direction slight slanted in a rearward direction toward the upward (refer to FIG. 3), and the portion corresponding to the lower edge portion of the opening 4 extends in a direction slight slanted in an upward direction toward the rearward (refer to FIG. 4). In addition, in the first embodiment, the weather strip 5 is attached to the flange portion 33 such that the injection molded portion 7 is positioned at a center of the lower edge portion of the opening 4.

Further, the hollow sealing portion 15 protrudes from the connecting portion 14 of the trim portion 11 in the outward side of the vehicle along an extension direction of the corresponding flange portion 33. That is, the portion (referred to as an upper side portion 5a) of the weather strip 5 corresponding to the upper edge portion of the opening 4 protrudes from the connecting portion 14 of the trim portion 11 in a direction slight slanted in a downward direction toward the upward (refer to FIG. 3), and the portion (referred to as a lower side portion 5b) corresponding to the lower edge portion of the opening 4 protrudes from the connecting portion 14 of the trim portion 11 in a direction slight slanted in an upward direction toward the rear (refer to FIG. 4). In this way, the hollow sealing portion 15 is pressed against the luggage compartment door 2 in a vertical direction (in an extension direction of the flange portion 33) to each of the opening surfaces 4a and 4b in the region including the front end lip 41 which is provided at the front end portion in the protruding direction.

The trim portion 11 is provided with an inner-peripheral-side holding lip 21 extending from the inner lateral surface of the inner-peripheral-side sidewall portion 12, and an outer-peripheral-side holding lip 22 extending from the inner lateral surface of the outer-peripheral-side sidewall portion 13. Two inner-peripheral-side holding lips 21 and two outer-peripheral-side holding lips 22 are provided at a predetermined distance in a mounting direction of the trim portion 11 to the flange portion 33. By relatively fitting the flange portion 33 into the inner side of the trim portion 11, the inner-peripheral-side holding lip 21 and the outer-peripheral-side holding lip 22 are pressed against the flange portion 33, and the mounting state of the weather strip 5 is maintained by the elastic force of the holding lips 21 and 22 or the like.

The extrusion molded portion 6 also includes a design lip 23 extending from the inner-peripheral-side sidewall portion 12 to an inner peripheral side of the opening 4 to cover an end edge of an interior member 29, a dewatering lip 24 extending from the outer-peripheral-side sidewall portion 13 to the outer peripheral side of the opening 4 to abut a panel (outer panel) constituting the body 3, and a sub lip 25 extending from a front end portion of the outer-peripheral-side sidewall portion 13 to the inner peripheral side of the opening 4 to abut the outer panel.

In the first embodiment, the trim portion 11 and the holding lips 21 and 22 are basically made from solid EPDM (ethylene-propylene-diene monomer rubber), and the hollow sealing portion 15, the design lip 23, the dewatering lip 24, and the sub lip 25 are made from sponge EPDM. However, a root portion of the outer-peripheral-side holding lip 22 of the flange portion 33 is made from the sponge EPDM.

In addition, the extrusion molded portion 6 includes a sealing boss portion 27 of a substantially semicircular cross section which protrudes from the inner peripheral surface of the connecting portion 14 to the inside of the trim portion 11. In the state in which the weather strip 5 is mounted on the flange portion 33, the sealing boss portion 27 abuts the front end edge of the flange portion 33. Due to the presence of the sealing boss portion 27 or the dewatering lip 24 and the sub lip 25, it is possible to reliably prevent rainwater or the like from penetrating into an indoor side (luggage compartment) through a gap between the trim portion 11 and the flange portion 33.

Figure 5:
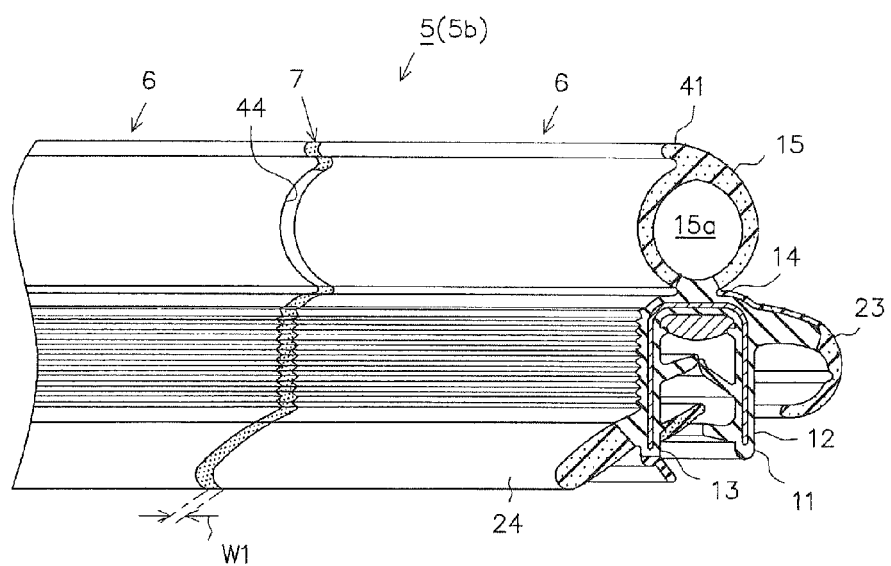
FIG. 5 is a perspective view illustrating an injection molded portion of a weather strip according to the present invention.
Figure 6:
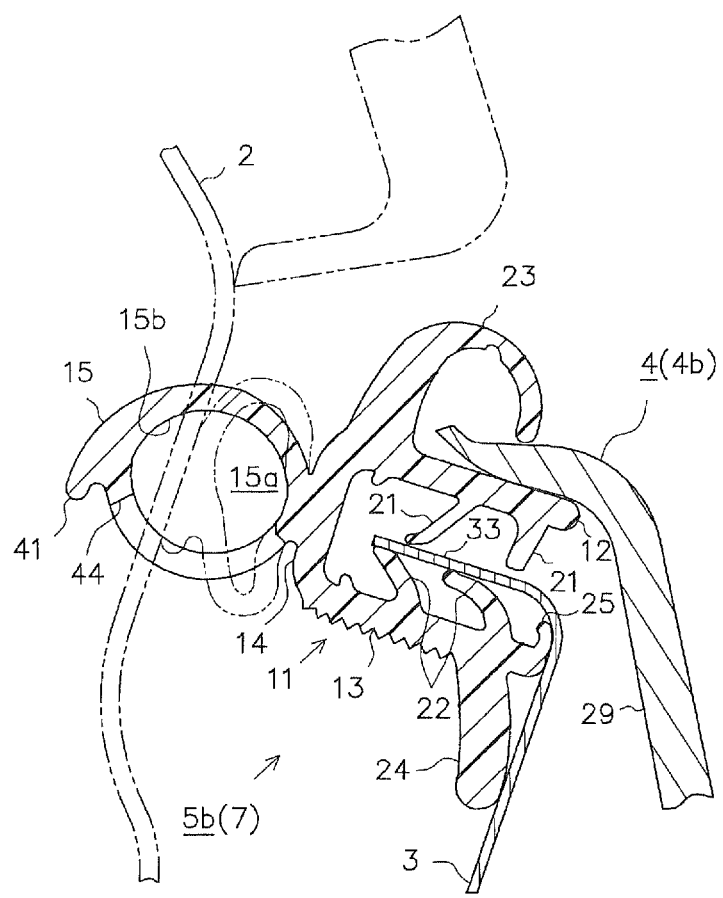
FIG. 6 is a cross-sectional view taken along the line K-K in FIG. 2 to illustrating a weather strip according to the present invention.

Meanwhile, the injection molded portion 7 is formed such that a connecting width W1 is 2.0 mm in the longitudinal direction (left and right direction in FIG. 5) of the weather strip, as shown in FIG. 5. The injection molded portion 7 basically has substantially the same sectional shape as that of the extrusion molded portion 6, as shown in FIG. 6, and includes a trim portion 11 and a hollow sealing portion 15. The injection molded portion 7 is different from the extrusion molded portion 6 in that the overall thereof is made from thermoplastic vulcanizates (TPV) of 40 IRHD (International rubber Hardness Degrees), in which the sealing boss portion 27 is omitted, and in which the insert 17 is not provided.

Figure 7:
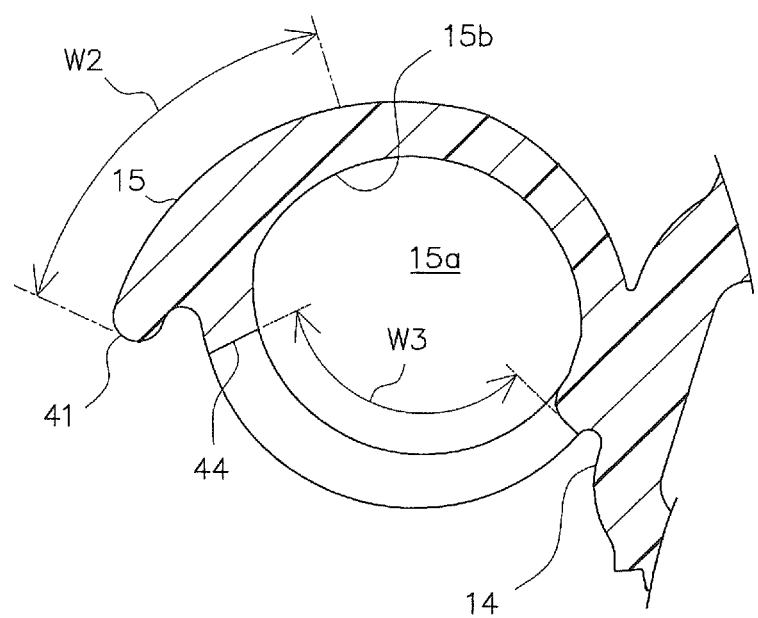
FIG. 7 is a partially enlarged cross-sectional view illustrating a hollow sealing portion or the like of an injection molded portion according to the present invention.

In addition, the injection molded portion 7 is provided with a core withdrawing hole 44 through which a core mold member 58 for molding the inner peripheral surface 15b (hollow portion 15a) of the hollow sealing portion 15 of the injection molded portion 7 is withdrawn after molding, as shown in FIGS. 5 to 7. Further, while the core mold member 58 will be described below in detail, the term "member" will be omitted in the description for other mold members, as well as the core mold member 58.

The core withdrawing hole 44 is formed at the portion of the hollow sealing portion 15, which is positioned at a lower side in the state in which it is mounted on the flange portion 33, over a region of the hollow sealing portion except for a region W2 serving as a sealing surface which is pressed against the luggage compartment door 2.

The core withdrawing hole 44 is set over the whole region (2.0 mm in width) of the injection molded portion 7 in the longitudinal direction of the weather strip, and is set such that the length W3 of the inner peripheral surface 15b of the hollow sealing portion 15 in the circumferential direction is 40% of the circumferential length of the inner peripheral surface 15b.

Figure 8:
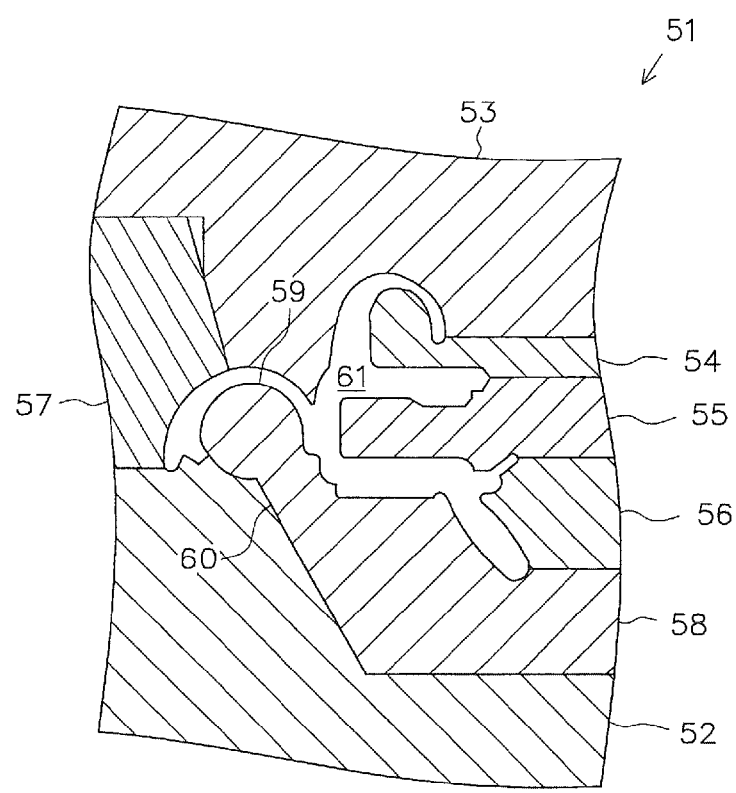
FIG. 8 is a cross-sectional view illustrating a molding device for molding an injection molded portion according to the present invention.

The molding device 51 for molding the injection molded portion 7 will now be described. FIG. 8 is a cross-sectional view illustrating the molding device 51 used for molding the injection molded portion 7. The molding device 51 includes, for example, a stationary mold 52 positioned at the lower portion in the drawing, and a plurality of movable molds (a first movable mold 53, a second movable mold 54, a third movable mold 55, a fourth movable mold 56, and a fifth movable mold 57). Further, a core mold 58 is provided between the stationary mold 52 and the fourth movable mold 56. The first to fifth movable molds 53 to 57 are provided to be relatively moved with respect to the stationary mold 52 by a cylinder (not illustrated) or the like. The core mold 58 has a core body 59 and a holding portion 60 extending integrally from the core body 59.

Figure 10:
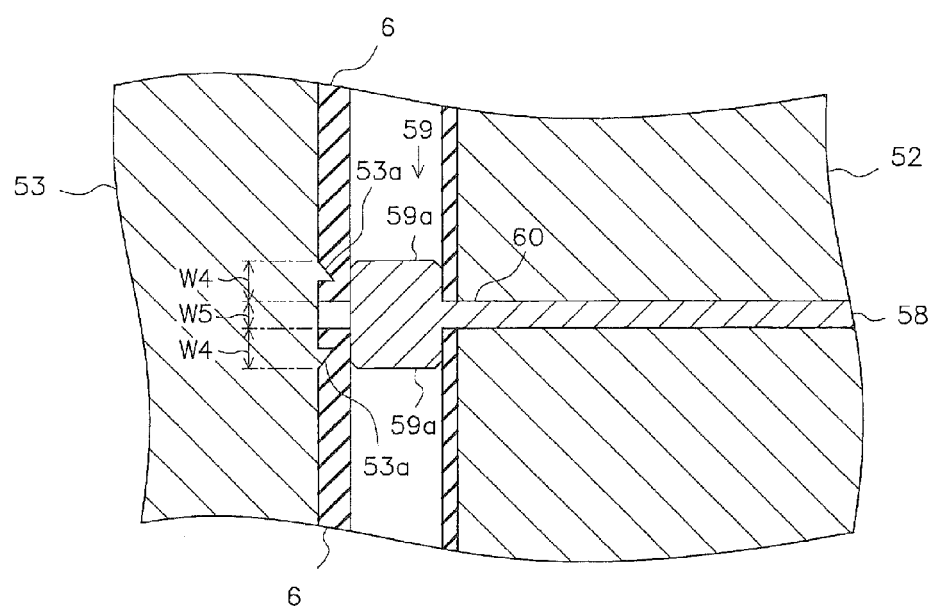
FIG. 10 is a cross-sectional view illustrating various molds in a state in which an extrusion molded portion of the present invention is fitted.

The core body 59 is set such that the length W4 of an inserting portion 59a inserted into the hollow sealing portion 15 is 3.0 mm and the thickness W5 of the holding portion 60 is 2.0 mm, as shown in FIG. 10.

The stationary mold 52 and the respective movable molds 53 to 57 are provided with a molding surface corresponding to an outer appearance shape of the injection molded portion 7. In addition, the core body 59 is for forming the inner peripheral surface 15b (hollow portion 15a) of the hollow sealing portion 15, and is installed in the center of the space enclosed by the stationary mold 52 and the respective movable molds 53 to 57. A cavity 61 is formed by these molding surfaces and the outer surface of the core body 59 to form the injection molded portion 7.

As shown in FIG. 10, the first movable mold 53 is provided with a pair of locking protrusions 53a for locking the extrusion molded portion 6, which is fitted into the inserting portion 59a, at the position opposite to the outer peripheral surface of the inserting portion 59a of the core body 59. The pair of locking protrusions 53a are formed such that the sectional shapes thereof in the longitudinal direction (upward and downward direction in FIG. 10) of the weather strip are respectively formed in a right triangle, and the surfaces perpendicular to the molding surface of the first movable mold 53 are respectively formed opposite to each other. In addition, the fifth movable mold 57 is provided with the same locking protrusions which are not shown.

Next, a method for producing the weather strip 5 including the above-described configuration, and operation effects obtained at the production will be described.

First, the extrusion molded portion 6 is formed through a known injection molding method by using an injection molding device (not illustrated). The extrusion molded portion 6 is cut to have a determined length in accordance with the circumferential length of the flange portion 33 of the opening 4 of the luggage compartment to be mounted.

Then, both ends of the extrusion molded portions 6 are connected to each other by the injection molded portion 7. More specifically, in the state in which each of the molds 52 to 57 and the like are opened, the elongated extrusion molded portion 6 is bent in accordance with the shape of the opening 4 of the luggage compartment, and the hollow sealing portion 15 is fitted into both ends of the core body 59 of the core mold 58 in the longitudinal direction (upward and downward direction in FIG. 10) such that both ends thereof face each other. The movable molds 53 to 57 and the core mold 58 are set and clamped at a predetermined position with respect to the stationary mold 52. In this way, the extrusion molded portion 6 is mounted and fixed to the molding device 51 to form the cavity 61, as shown in FIG. 8.

If the clamping is completed, as shown in FIG. 10, the extrusion molded portion 6 fitted into the core body 59 is under the state in which both ends thereof face each other at an interval of the connecting width W1 (2.0 mm) of the injection molded portion 7, and it prevents the releasing of the extrusion molded portion 6 from the core body 59 by the locking protrusions 53a of the first movable mold 53 or the like.

In addition, in the clamped state, the stationary mold 52 abuts the lateral surface of the core body 59, as shown in FIG. 8, and abuts the surface of the holding portion 60 which is consecutive to the lower surface of the core body 59.

Figure 9:
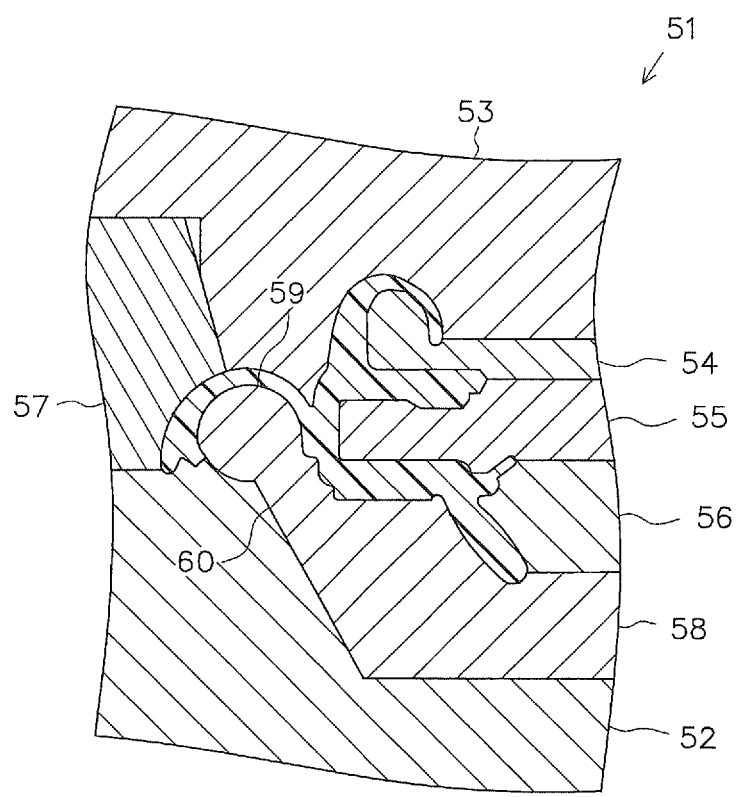
FIG. 9 is a cross-sectional view of a molding device according to the present invention illustrating a state in which a cavity is filled with a material.

From this state, the cavity 61 is introduced and filled with a plasticized TPV through a gate (not illustrated), as shown in FIG. 9. After that, the TPV is solidified. At that time, the hollow sealing portion 15 of the injection molded portion 7 is provided with core withdrawing hole 44 due to the presence of the holding portion 60 and the stationary mold 52 which abuts the holding portion 60.

After the solidification, the movable molds 53 to 57 are sequentially opened, and the molded injection molded portion 7 is released from the stationary mold 52 together with the core mold 58.

In this step, the core body 59 is exposed at the portion in which the core body 59 is spaced apart from the stationary mold 52. That is, a portion of the core withdrawing hole 44 is opened.

Next, the holding portion 60 is held in the state in which the injection molded portion 7 is separately supported, and the core body 59 is withdrawn from the core withdrawing hole 44 by withdrawing it from the hollow sealing portion 15. In this way, the hollow portion 15a is formed in the hollow sealing portion 15.

In this way, the weather strip 5 of an annular shape is obtained in which both ends of the extrusion molded portion 6 are connected to each other by the injection molded portion 7.

As described in detail above, according to the first embodiment, the injection molded portion 7 itself is provided with the core withdrawing hole 44 through which the core mold 58 used to form the hollow sealing portion 15 of the injection molded portion 7 is withdrawn after molding. For this reason, the process of forming the core withdrawing hole in advance in the extrusion molded portion 6 is not necessary. Further, it is not necessary to use a sheet material or the like specially for connecting the extrusion molded portion 6. As a result, it is possible to suppress the decrease in the productivity or the increase in the cost.

Moreover, since the hollow sealing portion 15 is not clogged by the sheet material, there is no concern that a load applied when the luggage compartment door 2 is closed is locally increased in the vicinity of the connecting portion. Further, a stepped portion is hardly to be formed between the injection molded portion 7 and the extrusion molded portion 6, and it is possible to suppress the decrease in the sealing capability.

Since the connecting width W1 of 0.2 mm of the injection molded portion 7 is relatively narrow, and thus the opening area of the core withdrawing hole 44 opened there is relatively small, the injection molded portion 7 and the core withdrawing hole 44 hardly stick out. As a result, it looks highly attractive, and the quality of the appearance is improved.

In addition, since the opening area of the core withdrawing hole 44 is relatively small, even though there is no support lip for closing the core withdrawing hole 44 while supporting the hollow sealing portion 15 when the luggage compartment door 2 is closed, a load difference applied when the luggage compartment door 2 is closed is not increased between the injection molded portion 7 and the extrusion molded portion 6 in the vicinity of the injection molded portion. Further, it is not necessary to provide a support lip or the like which interferes in the core withdrawing operation.

As the width of 2.0 mm of the core withdrawing hole 44 in the longitudinal direction of the weather strip is set to be relatively narrow, since the length W3 of the inner peripheral surface 15b of the hollow sealing portion 15 in the circumferential direction is set to be relatively long such that it is 40% of the circumferential length of the inner peripheral surface 15b, there is no concern that it may be difficult to carry out the core withdrawing operation.

As a result, with the weather strip 5 according to the first embodiment and the production method thereof, it is possible to easily withdraw the core mold 58, without causing a decrease in a quality of an appearance or a sealing capability thereof.

In addition, the first movable mold 53 or the like is provided with the pair of locking protrusions 53a for locking the extrusion molded portion 6 which is fitted into the core body 59. In this way, it is possible to reduce the concern that the extrusion molded portion 6 may be deviated from the core body 59 by an ejection pressure when the material is extruded into the cavity 61.

Further, since the injection molded portion 7 is made from the TPV of 40 IRHD which has a viscosity lower than a rubber material such as EPDM or the like and does not require vulcanization, it is possible to reduce the concern that the extrusion molded portion 6 may be deviated from the core body 59 by the ejection pressure of the material.

As a result, as compared with the case of forming using the rubber material, it is possible to shorten the region holding the extrusion molded portion 6. In addition, as in the first embodiment, as the length W4 of the inserting portion 59a of the core body 59 is set to be 3.0 mm, since the inserted quantity of the core body 59 into the extrusion molded portion 6 can be reduced, it is possible to shorten the length of the core body 59 and thus to form the core withdrawing hole 44 so as to be relatively small.

In addition, by using the TPV, a trace locked by the locking protrusion 53a or the like is hardly to be left on the extrusion molded portion 6, without leaving a trace, which is formed by a hot mold when the rubber material is vulcanized, on the extrusion molded portion 6. Further, by using the TPV, it is possible to eliminate the vulcanizing process, and as compared with the case of using the rubber material, the circumferential edge of the core withdrawing hole 44 is hardly broken during the core withdrawing operation.

As a result, the core withdrawing operation becomes easy, and it is possible to improve the productivity and the quality of the appearance.

In addition, a portion of the core withdrawing hole 44 is formed by the stationary mold 52 abutting the holding portion, as well as the holding portion 60 of the core mold 58. That is, the core withdrawing hole 44 is formed to be longer than the width of the holding portion 60 in the circumferential direction of the hollow sealing portion 15. In this way, since the core withdrawing hole 44 is opened further widely with respect to the longitudinal direction of the weather strip, it is possible to easily carry out the core withdrawing operation.

In addition, the present invention is not limited to the description of the first embodiment, and can be implemented, for example, by the following. Of course, other applications and modifications which are not illustrated in the drawings can be achieved.

Figure 11:
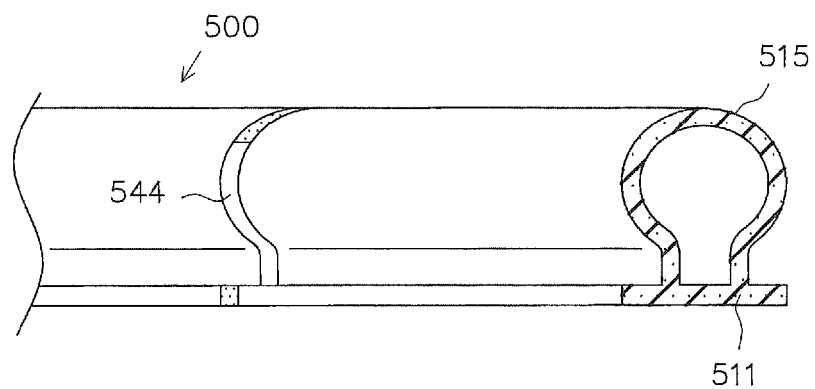
FIG. 11 is a perspective view illustrating an injection molded portion of a weather strip according to another embodiment of the present invention.

(a) In the first embodiment, the present invention is embodied by the weather strip 5 which is mounted on the circumferential edge of the opening 4 of the luggage compartment, but it is not limited thereto, and can be embodied by another weather strips. For example, as shown in FIG. 11, it can be applied to a door weather strip 500 which includes a flat mounting base portion 511 and a hollow sealing portion 515, and is mounted on the circumferential edge of the door. In addition, the core withdrawing hole is 544 in this embodiment. Further, the hollow sealing portion (15) is provided with the front end lip (41) in the first embodiment, but a shape, in which the hollow sealing portion 515 is not provided with the front end lip, as in the door weather strip 500, is possible.

(b) In the first embodiment, the connecting width W1 of the injection molded portion 7 in the longitudinal direction of the weather strip is set to 2.0 mm, but the connecting width W1 is not limited thereto. If the connecting width W1 of the injection molded portion 7 is set to less than 0.5 mm, the holding portion 60 of the core mold 58 needs to be very thin, and thus it is difficult to obtain the strength of the core mold 58, so that the durability of the molding device 51 may be deteriorated. Meanwhile, if the connecting width W1 of the injection molded portion 7 is more than 3.0 mm, it will look unattractive. Accordingly, it is desirable that the connecting width W1 of the injection molded portion 7 is set to 0.5 mm or more and 3.0 mm or less.

(c) In the first embodiment, the length W3 of the core withdrawing hole 44 along the circumferential direction of the inner peripheral surface 15b of the hollow sealing portion 15 is 40% of the circumferential length of the inner peripheral surface 15b, but the length W3 of the core withdrawing hole 44 is not limited thereto. If the length W3 of the core withdrawing hole 44 is less than 25% of the circumferential length of the inner peripheral surface 15b of the hollow sealing portion 15, there is a concern that the core body 59 may not be easily withdrawn, and the circumferential edge of the core withdrawing hole 44 may be broken. Meanwhile, if the length W3 of the core withdrawing hole 44 is more than 45% of the circumferential length W0 of the inner peripheral surface 15b of the hollow sealing portion 15, there is a concern that it is difficult to secure the sealing surface or prevent the water from entering. Accordingly, it is desirable that the length W3 of the core withdrawing hole is set to be 25% or more and 45% or less of the circumferential length of the inner peripheral surface 15b of the hollow sealing portion 15.

(d) In the first embodiment, the injection molded portion 7 is made from TPV, but it is not limited to such a configuration. For example, the injection molded portion may be made from other materials such as uncross-linked olefin-based thermoplastic elastomer (TPO). In addition, TPV having hardness of 20 to 60 IRHD can be used.

(e) In the first embodiment, the core withdrawing hole 44 is formed in the lower portion of the hollow sealing portion 15 in the state in which it is mounted on the flange portion 33. The formation position of the core withdrawing hole 44 is not limited thereto. For example, in a case where the length W3 of the core withdrawing hole 44 is as relatively short as 25% of the circumferential length of the inner peripheral surface 15b of the hollow sealing portion 15, it may be formed at the upper portion of the hollow sealing portion 15 in the state in which it is mounted on the flange portion 33, in the region of the hollow sealing portion except for the region W2 to be the sealing surface which is pressed against the luggage compartment door 2. It is desirable in that if the core withdrawing hole 44 is formed toward the lower side, it can suppress the decrease in the quality of the appearance, since it hardly sticks out after the weather strip 5 is mounted.

(f) In the first embodiment, the first movable mold 53 is provided with the pair of locking protrusions 53a for locking the extrusion molded portion 6, which is fitted into the inserting portion 59a of the core body 59, in which the pair of locking protrusions 53a is formed of the right triangle in a cross section. The configuration of the locking protrusions 53a is not limited to the first embodiment. For example, it can employ an isosceles triangle in a cross section or a quadrangle in a cross section. In order to prevent the extrusion molded portion 6 from being released, as in the first embodiment, it is desirable that it has surfaces perpendicular to the opposite surfaces of the pair of the locking protrusions in the longitudinal direction of the weather strip. In addition, a configuration in which the locking protrusions 53a are omitted is possible.

Further, the core body 59 side may be provided with the locking protrusion. In this instance, since the core body 59 is enlarged, it is difficult to carry out the core withdrawing operation. Also, there is a concern that the circumferential edge of the core withdrawing hole 44 may be broken by the locking protrusion during the core withdrawing operation. Therefore, it is more desirable that the locking protrusion is provided at the first movable mold 53 or the like opposite the core body 59.

(g) In the first embodiment, during the mold forming, a portion of the core withdrawing hole 44 is formed by the stationary mold 52 abutting the holding portion 60, as well as the holding portion 60 of the core mold 58, but it is not limited thereto. The core withdrawing hole 44 may be formed only by the holding portion 60 of the core mold 58.

Second Embodiment

Figure 12:
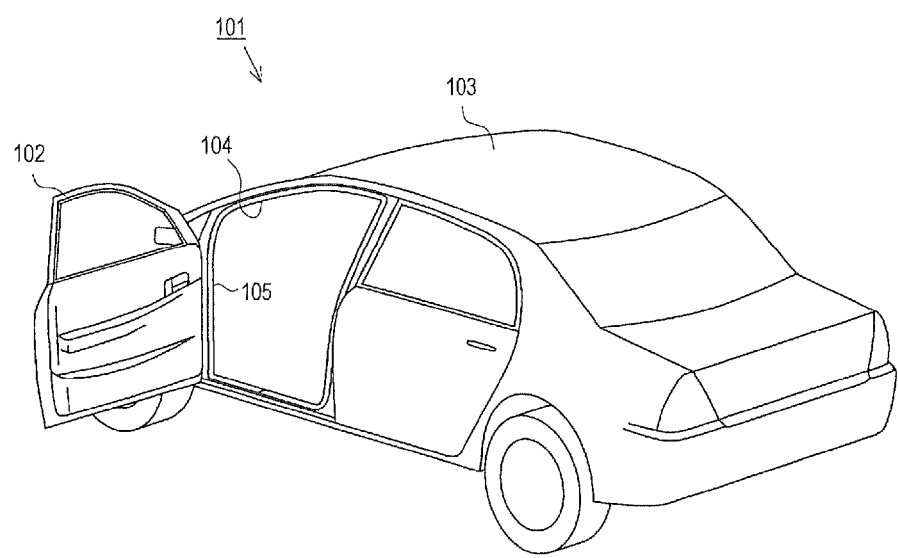
FIG. 12 is a perspective view illustrating an automobile in a state in which a front door is opened.
Figure 13:
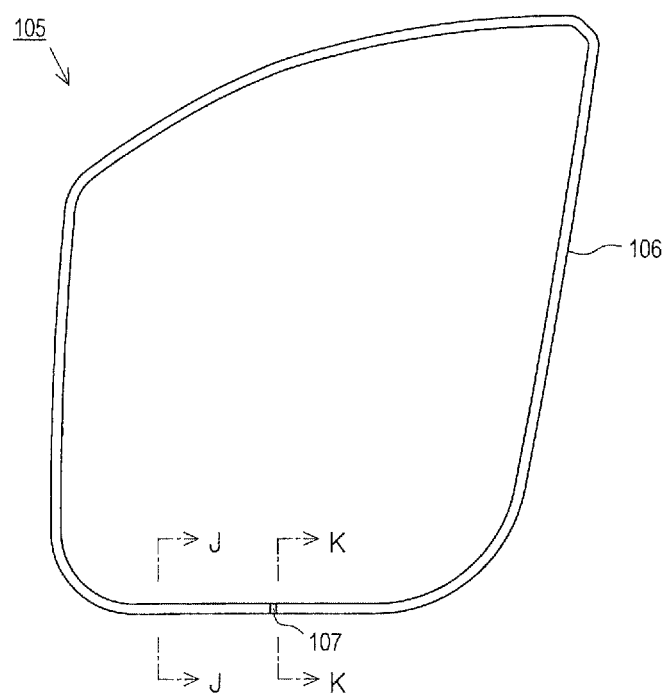
FIG. 13 is a front view of a weather strip.
Figure 14:
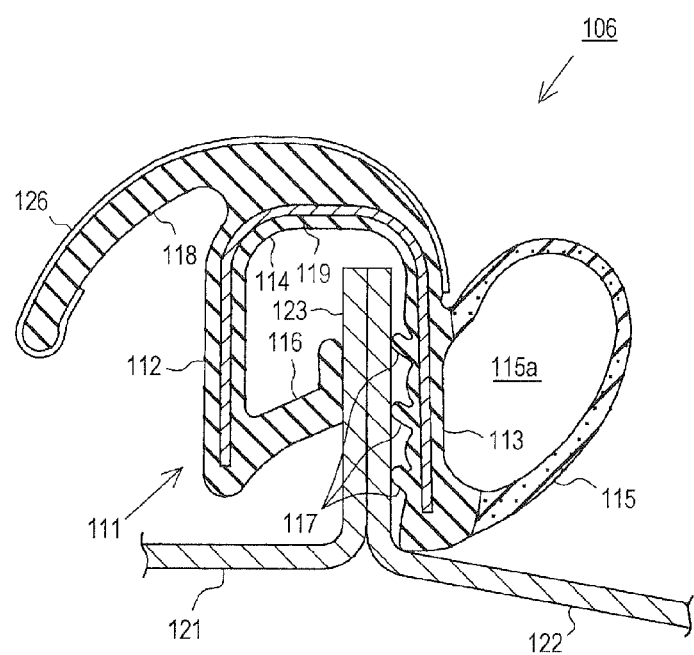
FIG. 14 is a cross-sectional view taken along the line J-J in FIG. 13 illustrating a weather strip.

A second embodiment will now be described with reference to the accompanying drawings. FIG. 12 is a perspective view illustrating an automobile in a state in which a front door is opened. FIG. 13 is a front view of a weather strip. FIG. 14 is a cross-sectional view taken along the line J-J in FIG. 13 illustrating a weather strip.

As shown in FIG. 12, an automobile 101 serving as an automobile vehicle is provided with an automobile door (front door in the drawing; referred to as a "door 102") which can be opened or closed. In addition, a circumferential edge of a door opening 4 of an automobile body 103 (automobile body) corresponding to the door 102 is provided with an opening trim weather strip 105 (referred to as a "weather strip 105").

As shown in FIG. 13, the weather strip 105 according to the second embodiment includes an extrusion molded portion 106 formed in the shape of a substantially straight line by injection molding, and an injection molded portion 107 (portion indicated by a scatter plot shape in FIGS. 13 and 15) for connecting both ends of the extrusion molded portions 106 in the shape of a straight line, and is formed in an annular shape in general.

As shown in FIG. 14, the extrusion molded portion 106 includes a trim portion 111 of a substantially U-shaped cross section having a vehicle inner sidewall portion 112, a vehicle outer sidewall portion 113, a connecting portion 114 for connecting both sidewall portions 112 and 113, and a hollow sealing portion 115 protruding automobile-outwardly from the vehicle outer sidewall portion 113 and having a hollow portion 115a therein.

The inner surface (vehicle outer lateral surface) of the vehicle inner sidewall 112 is formed integrally with a holding lip 116 extending to the inside (vehicle outer side) of the trim portion 111, and the inner surface (vehicle inner lateral surface) of the vehicle outer sidewall 113 is formed integrally with a plurality of holding lips 117 extending to the inside (vehicle inner side) of the trim portion 111.

In addition, the connecting portion 114 is provided with a design lip 118 extending therefrom to cover an end of the interior article (not illustrated) such as an embellishment.

The trim portion 111 is embedded with a metallic insert 119 therein by a sheath material such as solid rubber EPDM (ethylene-propylene-diene monomer rubber). Meanwhile, the hollow sealing portion 115 is made from EPDM sponge rubber.

The circumferential edge of the opening 104 is provided with a flange portion 123 by bonding an inner panel 121 and an outer panel 122 of the automobile body 103. By fitting the trim portion 111 into the flange portion 123, the weather strip 105 is held at the circumferential edge of the door opening 104.

In addition, when the door 102 is closed, the hollow sealing portion 115 is pressed against the circumferential edge of the door 102, and thus is distorted and deformed, so that the gap between the door 102 and the automobile body 103 is sealed.

In the state in which the weather strip 105 is mounted, the outer surface of the region from approximately a front end of the design lip 118 to a proximal end, and further to the connecting portion 114 of the trim portion 111 and a conjunction portion with the hollow sealing portion 115 at the vehicle outer sidewall portion 113 becomes a design surface which is shown from the appearance. For this reason, the design surface is formed with a decorative layer 126 made of a non-woven fabric or the like.

Figure 15:
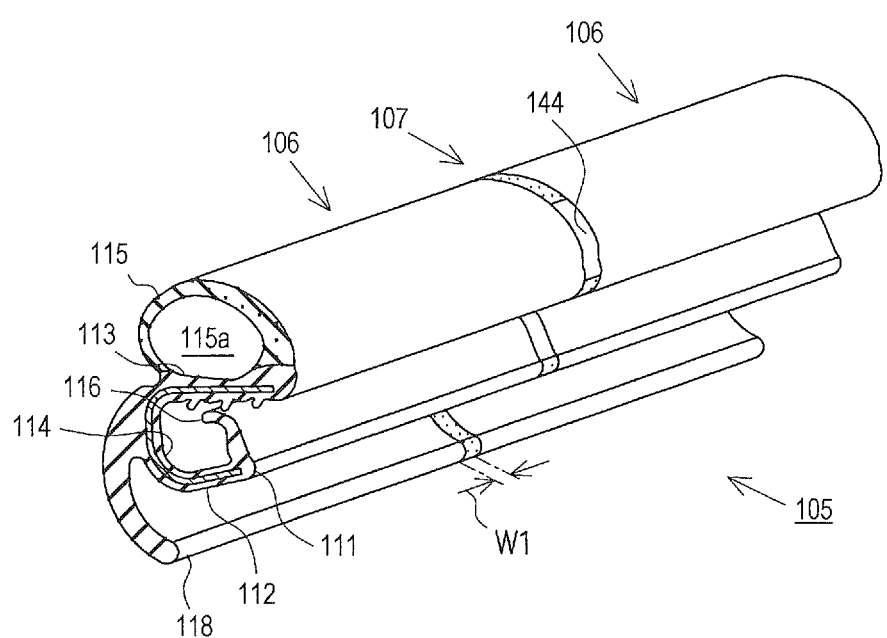
FIG. 15 is a perspective view illustrating an injection molded portion of a weather strip.

Meanwhile, the injection molded portion 107 is formed such that a connecting width W1 is 2.0 mm in the longitudinal direction (left and right direction in FIG. 15) of the weather strip, as shown in FIG. 15. The injection molded portion 107 basically has substantially the same sectional shape as that of the extrusion molded portion 106, as shown in FIG. 15, and includes the trim portion 111 and the hollow sealing portion 115. The injection molded portion 107 is different from the extrusion molded portion 106 in that the overall thereof is made from thermoplastic vulcanizates (TPV) of 40 IRHD (International rubber Hardness Degrees), that the holding lips 116 and 117, the insert 117, and the decorative layer 126 are not provided.

Figure 16:
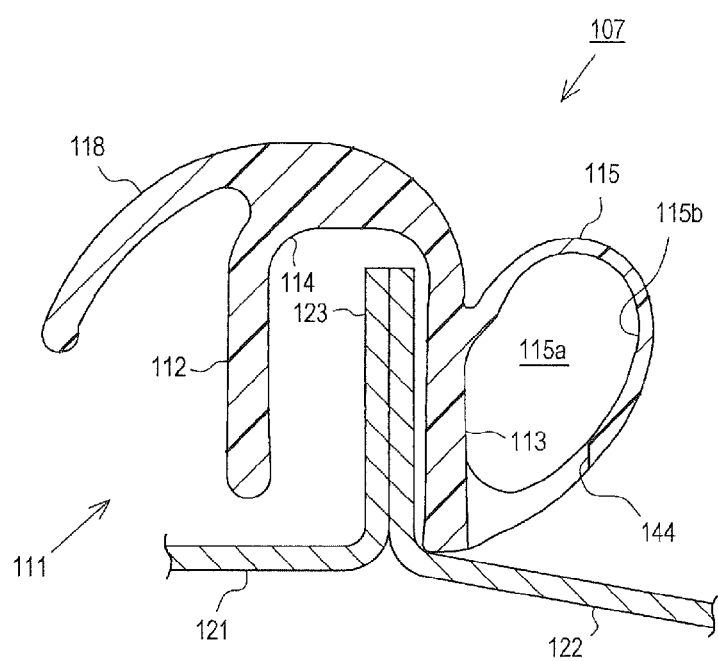
FIG. 16 is a cross-sectional view taken along the line K-K in FIG. 13 illustrating a weather strip.
Figure 17:
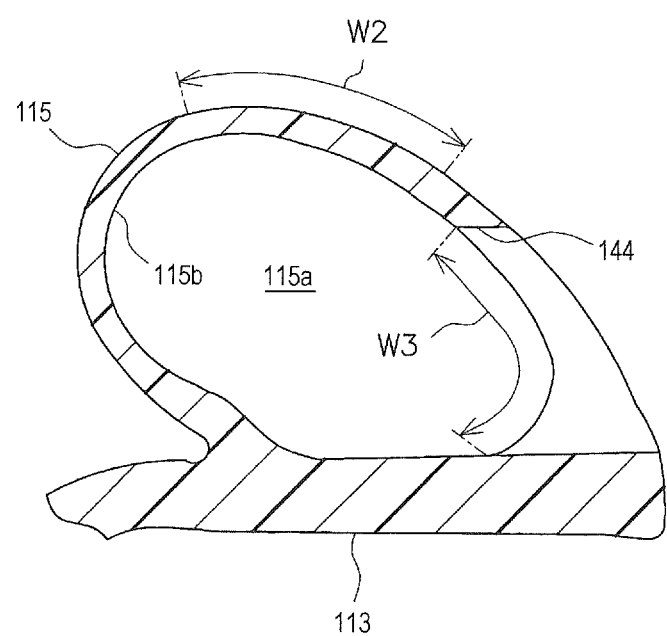
FIG. 17 is a partially enlarged cross-sectional view illustrating a hollow sealing portion or the like of an injection molded portion.

In addition, the injection molded portion 107 is provided with a core withdrawing hole 144 through a core mold member 158 for forming the inner peripheral surface 115b (hollow portion 115a) of the hollow sealing portion 115 of the injection molded portion 107 is withdrawn after molding, as shown in FIGS. 15 to 17. Further, while the core mold member 158 will be described below in detail, the term "member" will be omitted in the description for other mold members, as well as the core mold member 158.

The core withdrawing hole 144 is formed at the portion of the hollow sealing portion 115, which is positioned at a lower side in the state in which it is mounted on the flange portion 123, over a region of the hollow sealing portion except for a region W2 serving as a sealing surface which is pressed against the door 102.

The core withdrawing hole 144 is set over the whole region (2.0 mm in width) of the injection molded portion 107 in the longitudinal direction of the weather strip, and is set such that the length W3 of the inner peripheral surface 115b of the hollow sealing portion 115 in the circumferential direction is 40% of the circumferential length of the inner peripheral surface 115b.

Figure 18:
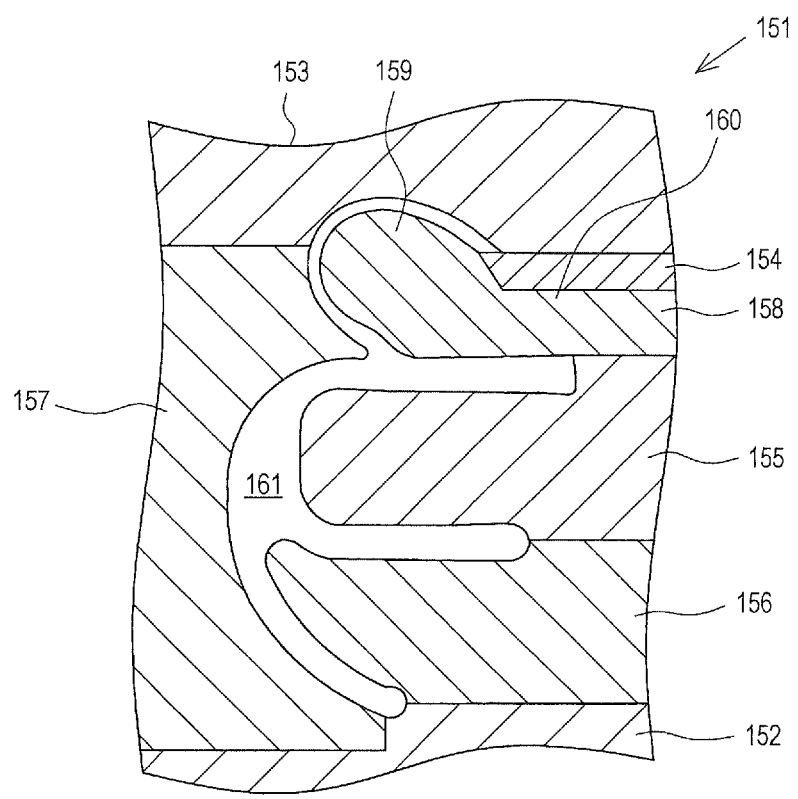
FIG. 18 is a cross-sectional view illustrating a molding device for molding an injection molded portion.

The molding device 151 for forming the injection molded portion 107 will now be described. FIG. 18 is a cross-sectional view illustrating the molding device 151 used for forming the injection molded portion 107. The molding device 151 includes, for example, a stationary mold 152 positioned at the lower portion in the drawing, and a plurality of movable molds (a first movable mold 153, a second movable mold 154, a third movable mold 155, a fourth movable mold 156, and a fifth movable mold 157). Further, a core mold 158 is provided between the second movable mold 154 and the third movable mold 155. The first to fifth movable molds 153 to 157 are provided to be relatively moved with respect to the stationary mold 152 by a cylinder (not illustrated) or the like. The core mold 158 has a core body 159 and a holding portion 160 integrally extending from the core body 159.

Figure 20:
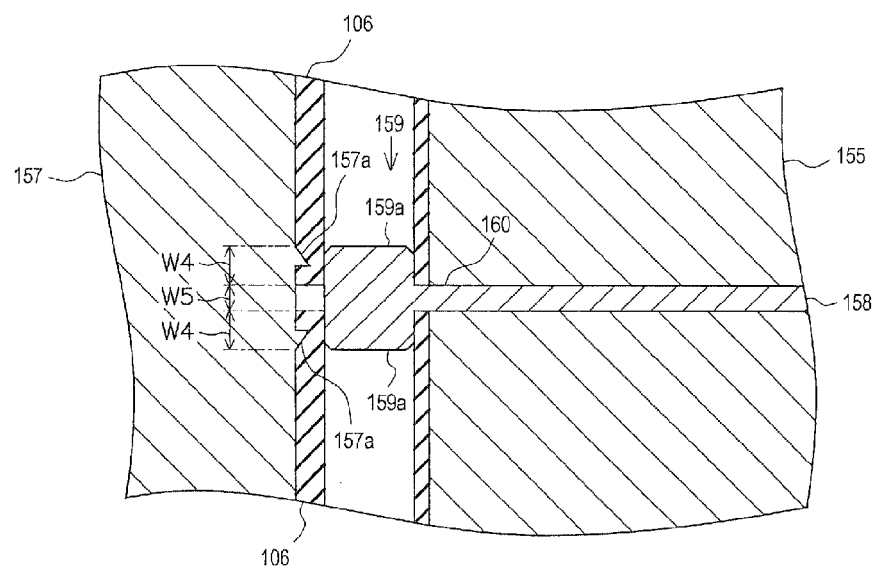
FIG. 20 is a cross-sectional view illustrating various molds in a state in which an extrusion molded portion is fitted.

The core body 159 is set such that the length W4 of an inserting portion 159a inserted into the hollow sealing portion 115 is 3.0 mm and the thickness W5 of the holding portion 160 is 2.0 mm, as shown in FIG. 20.

The stationary mold 152 and the respective movable molds 153 to 157 are provided with a molding surface corresponding to an outer appearance shape of the injection molded portion 107. In addition, the core body 159 is for forming the inner peripheral surface 115b (hollow portion 115a) of the hollow sealing portion 115, and is installed in the center of the space enclosed by the stationary mold 152 and the respective movable molds 153 to 157. A cavity 161 is formed by these molding surfaces and the outer surface of the core body 159 to form the injection molded portion 107.

As shown in FIG. 20, the fifth movable mold 157 is provided with a pair of locking protrusions 157a for locking the extrusion molded portion 106, which is fitted into the inserting portion 159a, at the position opposite to the outer peripheral surface of the inserting portion 159a of the core body 159. The pair of locking protrusions 157a is formed such that the sectional shapes thereof in the longitudinal direction (upward and downward direction in FIG. 20) of the weather strip are respectively formed in a right triangle, and the surfaces perpendicular to the molding surface of the fifth movable mold 157 are respectively formed opposite to each other. In addition, the first movable mold 153 is provided with the same locking protrusions which are not shown.

Next, a method for producing the weather strip 105 including the above-described configuration, and operation effects obtained at the production will be described.

First, the extrusion molded portion 106 is formed through a known injection molding method by using an injection molding device (not illustrated). The extrusion molded portion 106 is cut to have a determined length in accordance with the circumferential length of the flange portion 123 of the door opening 104 to be mounted.

Then, both ends of the extrusion molded portions 106 are connected to each other by the injection molded portion 107. More specifically, in the state in which each of the molds 152 to 157 and the like are opened, the elongated extrusion molded portion 106 is bent in accordance with the shape of the door opening 104, and the hollow sealing portion 115 is fitted into both ends of the core body 159 of the core mold 158 in the longitudinal direction (upward and downward direction in FIG. 20) such that both ends thereof face each other. The movable molds 153 to 157 and the core mold 158 are set and clamped at a predetermined position with respect to the stationary mold 152. In this way, the extrusion molded portion 106 is mounted and fixed to the molding device 151 to form the cavity 161, as shown in FIG. 18.

If the clamping is completed, as shown in FIG. 20, the extrusion molded portion 106 fitted into the core body 159 is under the state in which both ends thereof face each other at an interval of the connecting width W1 (2.0 mm) of the injection molded portion 107, and it prevents the releasing of the extrusion molded portion 106 from the core body 159 by the locking protrusions 157a of the fifth movable mold 157 or the like.

In addition, in the clamped state, the second movable mold 154 abuts the lateral surface of the core body 159, as shown in FIG. 18, and abuts the upper surface of the holding portion 160 which is consecutive to the lateral surface of the core body 159.

Figure 19:
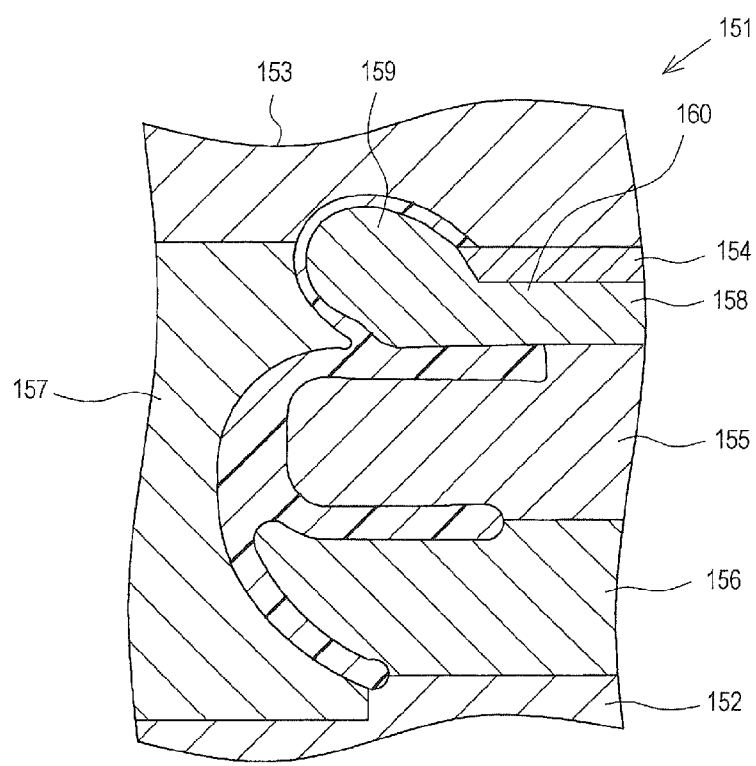
FIG. 19 is a cross-sectional view of a molding device illustrating a state in which a cavity is filled with a material.

From this state, the cavity 161 is introduced and filled with a plasticized TPV through a gate (not illustrated), as shown in FIG. 19. After that, the TPV is solidified. At that time, the hollow sealing portion 115 of the injection molded portion 107 is provided with core withdrawing hole 144 due to the presence of the holding portion 160 and the second movable mold 154 which abuts the holding portion 160.

After the solidification, the movable molds 153 to 157 are sequentially opened, and the formed injection molded portion 107 is released from the stationary mold 152 together with the core mold 158.

In this step, the core body 159 is exposed at the portion in which the core body 159 is spaced apart from the second movable mold 154. That is, a portion of the core withdrawing hole 144 is opened.

Next, the holding portion 160 is held in the state in which injection molded portion 107 is separately supported, and the core body 159 is withdrawn from the core withdrawing hole 144 by withdrawing it from the hollow sealing portion 115. In this way, the hollow portion 115a is formed in the hollow sealing portion 115.

In this way, the weather strip 105 of an annular shape is obtained in which both ends of the extrusion molded portion 106 is connected to each other by the injection molded portion 107.

As described in detail above, according to the second embodiment, the injection molded portion 107 itself is provided with the core withdrawing hole 144 through which the core mold 158 used to form the hollow sealing portion 115 of the injection molded portion 107 is withdrawn after molding. For this reason, the process of forming the core withdrawing hole in advance in the extrusion molded portion 106 is not necessary. Further, it is not necessary to use a sheet material or the like specially for connecting the extrusion molded portion 106. As a result, it is possible to suppress the decrease in the productivity or the increase in the cost.

Moreover, since the hollow sealing portion 115 is not clogged by the sheet material, there is no concern that a load applied when the door 102 is closed may be locally increased in the vicinity of the connecting portion. Further, a stepped portion is hardly formed between the injection molded portion 107 and the extrusion molded portion 106, and it is possible to suppress the decrease in the sealing capability.

Since the connecting width W1 of 0.2 mm of the injection molded portion 107 is relatively narrow, and thus the opening area of the core withdrawing hole 144 opened there is relatively small, the injection molded portion 107 and the core withdrawing hole 144 hardly stick out. As a result, it looks highly attractive, and the quality of the appearance is improved.

In addition, since the opening area of the core withdrawing hole 144 is relatively small, even though there is no support lip for closing the core withdrawing hole 144 while supporting the hollow sealing portion 115 when the door 102 is closed, a load difference applied when the door 102 is closed is not increased between the injection molded portion 107 and the extrusion molded portion 106 in the vicinity of the injection molded portion.

As the width of 2.0 mm of the core withdrawing hole 144 in the longitudinal direction of the weather strip is set to be relatively narrow, since the length W3 of the inner peripheral surface 115b of the hollow sealing portion 115 in the circumferential direction is set to be relatively long such that it is 40% of the circumferential length of the inner peripheral surface 115b, there is no concern that it may be difficult to carry out the core withdrawing operation.

As a result, with the weather strip 105 according to the second embodiment and the production method thereof, it is possible to easily withdraw the core mold 158, without causing a decrease in a quality of the appearance or a sealing capability thereof.

In addition, the first movable mold 153 or the like is provided with the pair of locking protrusions 157a for locking the extrusion molded portion 106 which is fitted into the core body 159. In this way, it is possible to reduce the concern that the extrusion molded portion 106 is deviated from the core body 159 by an ejection pressure when the material is extruded into the cavity 161.

Further, since the injection molded portion 107 is made from the TPV of 40 IRHD which has a viscosity lower than a rubber material such as EPDM or the like and does not require vulcanization, it is possible to reduce the concern that the extrusion molded portion 106 may be deviated from the core body 159 by the ejection pressure of the material.

As a result, as compared with the case of forming using the rubber material, it is possible to shorten the region holding the extrusion molded portion 106. In addition, as in the second embodiment, as the length W4 of the inserting portion 159a of the core body 159 is set to 3.0 mm, since the inserted quantity of the core body 159 into the extrusion molded portion 106 can be reduced, it is possible to shorten the length of the core body 159 and thus to form the core withdrawing hole 144 so as to be relatively small.

In addition, by using the TPV, a trace locked by the locking protrusion 157a or the like is hardly left on the extrusion molded portion 106, without leaving a trace, which is formed by a hot mold when the rubber material is vulcanized, on the extrusion molded portion 106. Further, by using the TPV, it is possible to eliminate the vulcanizing process, and as compared with the case of using the rubber material, the circumferential edge of the core withdrawing hole 144 is hardly broken during the core withdrawing operation.

As a result, the core withdrawing operation becomes easy, and it is possible to improve the productivity and the quality of the appearance.

In addition, at the time of injection molding, a portion of the core withdrawing hole 144 is formed by the second movable mold 154 abutting the core mold 158, as well as the holding portion 160 of the core mold 158. That is, the core withdrawing hole 144 is formed to be longer than the width of the holding portion 160 in the circumferential direction of the hollow sealing portion 115. In this way, since the core withdrawing hole 144 is opened further widely with respect to the longitudinal direction of the weather strip, it is possible to easily carry out the core withdrawing operation.

In particular, in the weather strip 105 according to the second embodiment, a portion of the hollow sealing portion 115 is formed of a portion of the vehicle outer sidewall portion 113 of the trim portion 111. When the core is withdrawn, the trim portion side hardly deforms, and thus the core is withdrawn only by deformation of the sealing wall side. Since the core withdrawing hole 144 is also formed by the second movable mold 154, the opening is further widened, so that the withdrawing operation can be easily carried out.

In addition, the present invention is not limited to the description of the second embodiment, and can be implemented, for example, by the following. Of course, other applications and modifications which are not illustrated in the drawings can be achieved.

(a) In the second embodiment, the present invention is embodied by the weather strip 105 which is mounted on the circumferential edge of the door opening 104 corresponding to the front door 102, but it is not limited thereto, and can be embodied by another weather strips which can be mounted on a door opening corresponding to another doors such as a rear door.

(b) In the second embodiment, the connecting width W1 of the injection molded portion 107 in the longitudinal direction of the weather strip is set to 2.0 mm, but the connecting width W1 is not limited thereto. If the connecting width W1 of the injection molded portion 107 is set to less than 0.5 mm, the holding portion 160 of the core mold 158 needs to be very thin, and thus it is difficult to obtain the strength of the core mold 158, such that the durability of the molding device 151 may be deteriorated. Meanwhile, if the connecting width W1 of the injection molded portion 107 is more than 3.0 mm, it will look unattractive. Accordingly, it is desirable that the connecting width W1 of the injection molded portion 107 is set to 0.5 mm or more and 3.0 mm or less.

(c) In the second embodiment, the length W3 of the core withdrawing hole 144 along the circumferential direction of the inner peripheral surface 115b of the hollow sealing portion 115 is 40% of the circumferential length of the inner peripheral surface 115b, but the length W3 of the core withdrawing hole 144 is not limited thereto. If the length W3 of the core withdrawing hole 144 is less than 25% of the circumferential length of the inner peripheral surface 115b of the hollow sealing portion 115, there is a concern that the core body 159 may not be easily withdrawn, and the circumferential edge of the core withdrawing hole 144 may be broken.

Meanwhile, if the length W3 of the core withdrawing hole 144 is more than 45% of the circumferential length of the inner peripheral surface 115b of the hollow sealing portion 115, it is difficult to secure the sealing surface or prevent the water from entering. Accordingly, it is desirable that the length W3 of the core withdrawing hole 144 is set to be 25% or more and 45% or less of the circumferential length of the inner peripheral surface 115b of the hollow sealing portion 115.

(d) In the second embodiment, the injection molded portion 107 is made from TPV, but it is not limited to such a configuration. For example, the injection molded portion may be made from other materials such as uncross-linked olefin-based thermoplastic elastomer (TPO). In addition, TPV having hardness of 20 to 60 IRHD can be used.

(e) In the second embodiment, the core withdrawing hole 144 is formed in the lower portion of the hollow sealing portion 115 in the state in which it is mounted on the flange portion 123. The formation position of the core withdrawing hole 144 is not limited thereto. For example, in a case where the mounting of the injection molded portion 107 serves as a hinge side of the door, the length W3 of the core withdrawing hole 144 is as relatively short as 25% of the circumferential length of the inner peripheral surface 115b of the hollow sealing portion 115, it may be formed at the portion (the portion of the connecting portion 114 side of the trim portion 111) of the hollow sealing portion 115 which is positioned inside the door opening in the state in which it is mounted on the flange portion 123, in the region of the hollow sealing portion except for the region W2 to be the sealing surface which is pressed against the door 102. It is desirable that if the core withdrawing hole 144 is formed toward the lower side, it can suppress the decrease in the quality of the appearance, since it hardly sticks out after the weather strip 105 is mounted.

(f) In the second embodiment, the fifth movable mold 157 is provided with the pair of locking protrusions 157a for locking the extrusion molded portion 106, which is fitted into the inserting portion 159a of the core body 159, in which the pair of locking protrusions 157a is formed of the right triangle in a cross section. The configuration of the locking protrusions 157a is not limited to the second embodiment. For example, it can employ an isosceles triangle in a cross section or a quadrangle in a cross section. In order to prevent the extrusion molded portion 106 from being released, as the second embodiment, it is desirable that it has surfaces perpendicular to the opposite surfaces of the pair of the locking protrusions in the longitudinal direction of the weather strip. In addition, a configuration in which the locking protrusions 157a are omitted is possible.

Further, the core body 159 side may be provided with the locking protrusion. In this instance, since the core body 159 is enlarged, it is difficult to carry out the core withdrawing operation. Also, there is a concern that the circumferential edge of the core withdrawing hole 144 may be broken by the locking protrusion during the core withdrawing operation. Therefore, it is more desirable that the locking protrusion is provided at the fifth movable mold 157 or the like opposite to the core body 159.

(g) In the second embodiment, during the injection molding, a portion of the core withdrawing hole 144 is formed by the second movable mold 154 abutting the holding portion 160, as well as the holding portion 160 of the core mold 158, but it is not limited thereto. The core withdrawing hole 144 may be formed only by the holding portion 160 of the core mold 158.

(h) A configuration in which a scuff plate or the like is mounted onto the lower edge portion of the door opening 104 is possible. In this way, since the trim portion 111 of the injection molded portion 107 is covered by the scuff plate, the quality of new appearance can be further improved.

(i) In the weather strip 105 according to the second embodiment, both ends of single extrusion molded portion 106 are connected at one place by the injection molded portion 107. In addition, in the state in which the weather strip 105 is mounted on the door opening 104, the injection molded portion 107 is positioned at the approximate center of the lower edge portion of the door opening 104. The number and position of the injection molded portion 107 are not limited to the second embodiment.

Figure 21:
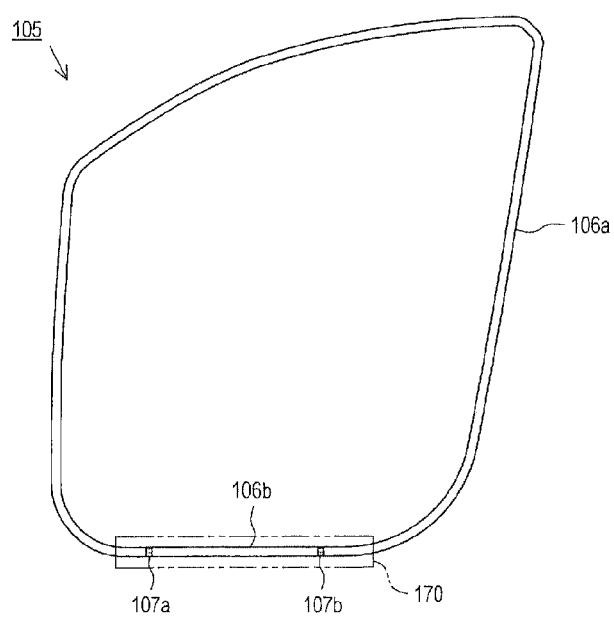
FIG. 21 is a front view illustrating a weather strip according to another embodiment.

For example, as shown in FIG. 21, a plurality of extrusion molded portions may be connected to plural places by a plurality of injection molded portions. In the example shown in FIG. 21, two extrusion molded portions 106a and 106b are connected at two places by two injection molded portions 107a and 107b. In such a configuration, in view of improving the quality of the appearance, it is desirable that the plurality of injection molded portions 107a and 107b is all positioned in the region (lower side of the weather strip 105) of the lower edge portion of the door opening 104. In addition, it is desirable that the trim portions are covered by the scuff plate 170 or the like.

In addition, the extrusion molded portion 106b of the lower side which is covered by the scuff plate 170 or the like may employ various configurations different from the second embodiment in order to achieve its light weight. For example, it is desirable to employ at least one of the following configurations (1) to (5).

(1) the trim portion 111 and the hollow sealing portion 115 are both formed by sponge rubber, (2) the insert 119 is omitted, (3) the decorative layer 126 is omitted, (4) the design lip 118 is omitted, and (5) a portion of the trim portion 111 (for example, the vehicle inner sidewall portion 112 or the holding lip 116) is omitted, and is adhered to the flange portion 123 or the like by a double-sided adhesive tape or the like. In addition, the sectional shape of the hollow sealing portion 115 of the extrusion molded portion 106b of the configurations (1) to (5) is identical to that of the hollow sealing portion 115 of the extrusion molded portion 106a, and the appearance of the cross section of the hollow sealing portion at the formed connecting portion having the width of 2 mm is identical to that except for the portion of the core withdrawing hole 144.

Third Embodiment

Figure 22:
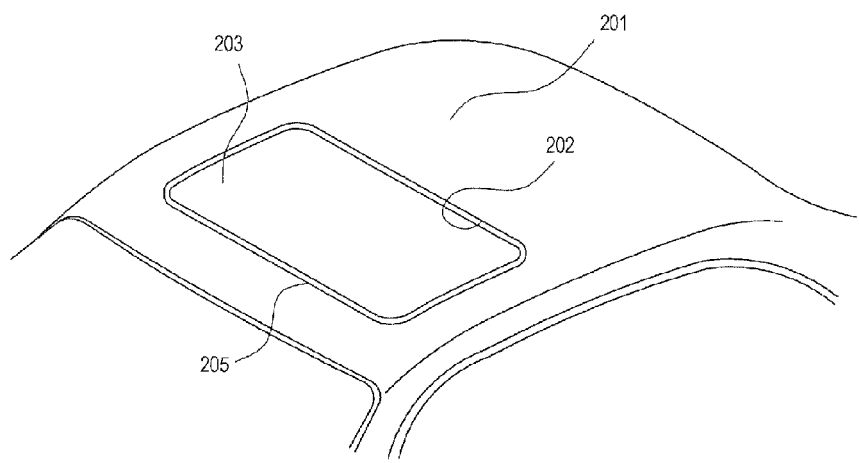
FIG. 22 is a perspective view illustrating a loop panel or the like of an automobile.
Figure 23:
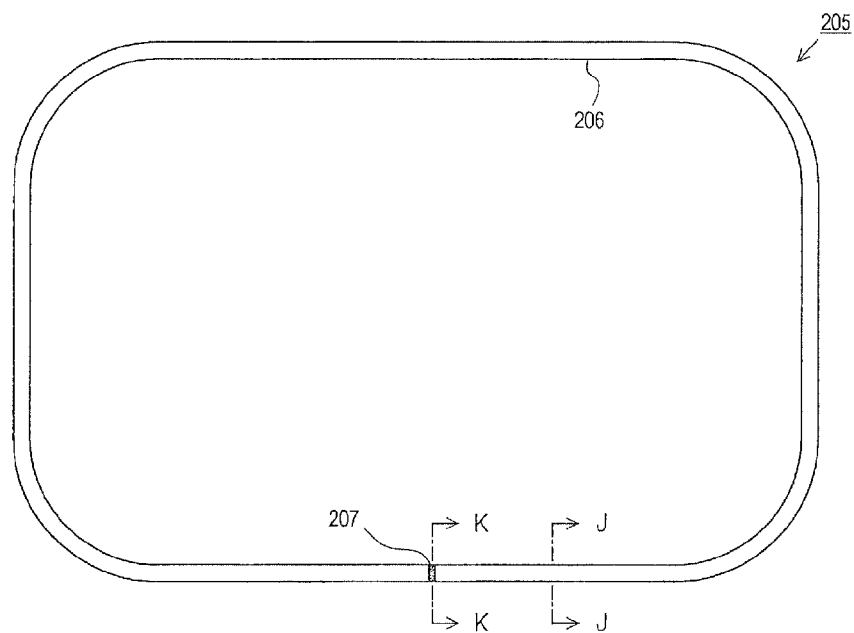
FIG. 23 is a front view of a weather strip.
Figure 24:
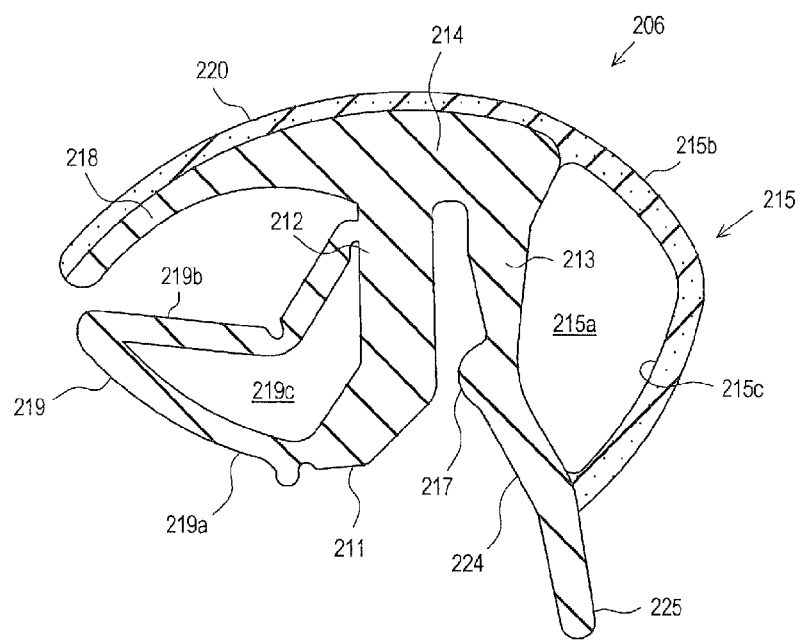
FIG. 24 is a cross-sectional view taken along the line J-J in FIG. 23 illustrating a weather strip.

A third embodiment will now be described with reference to the accompanying drawings. FIG. 22 is a perspective view illustrating a loop panel or the like of an automobile. FIG. 23 is a front view of a weather strip. FIG. 24 is a cross-sectional view taken along the line J-J in FIG. 23 illustrating a weather strip.

As shown in FIG. 22, a loop panel 201 of an automobile vehicle is provided with a loop panel opening 202 and a sliding loop 203 serving as a movable loop for opening and closing the loop panel opening 202. A circumferential edge of the sliding loop 203 is provided with a sliding loop weather strip 205 (referred to as a "weather strip 205").

As shown in FIG. 23, the weather strip 205 according to the third embodiment includes an extrusion molded portion 206 formed in the shape of a substantially straight line by injection molding, and an injection molded portion 207 (portion indicated by a scatter plot shape in FIGS. 23 and 26) for connecting both ends of the extrusion molded portions 206 in the shape of a straight line, and is formed in an annular shape in general.

As shown in FIG. 24, the extrusion molded portion 206 includes a trim portion 211, serving as a mounting base portion, of a substantially U-shaped cross section having an inner-peripheral-side sidewall portion 212, an outer-peripheral-side sidewall portion 213, a connecting portion 214 for connecting both sidewall portions 212 and 213, and a hollow sealing portion 215 protruding automobile-outwardly from the outer-peripheral-side sidewall portion 213 and having a hollow portion 215a therein and an annular sealing wall 215b.

The outer-peripheral-side sidewall portion 213 is integrally provided with a holding boss 217 protruding from a lower end thereof toward the inner peripheral side (left side in FIG. 24) of the weather strip. In addition, the extrusion molded portion 206 is provided with an extension base portion 224 extending outward (outer peripheral side of the weather strip) at a slant from the lower end of the outer-peripheral-side sidewall portion 213, and a dewatering lip 225 extending outward at a further slant from the lower end of the extension base portion 224. Further, the dewatering lip 225 may extend immediately under the lower end of the extension base portion 224.

In addition, the inner-peripheral-side sidewall portion 212 is integrally provided with a vehicle outer sealing lip 218 extending from the upper end thereof to the inner peripheral side of the weather strip, and a vehicle inner sealing lip 219 extending from the lower end thereof to the inner peripheral side of the weather strip.

The vehicle inner sealing lip 219 has a body lip 219a of a vehicle inner side (lower side in FIG. 24), a sub lip 219b of a vehicle outer side (upper side in FIG. 24), and a hollow portion 219c interposed between two lips 219a and 219b.

The trim portion 211 is made from EPDM (ethylene-propylene-diene monomer) solid rubber, and the sealing wall 215b of the hollow sealing portion 215 is made from EPDM sponge rubber. In addition, the outer surface of the vehicle outer sealing lip 218 is formed with a sheath layer 220 made from the EPDM sponge rubber which extends from a sealing wall 215 of the hollow sealing portion 215.

Figure 25:
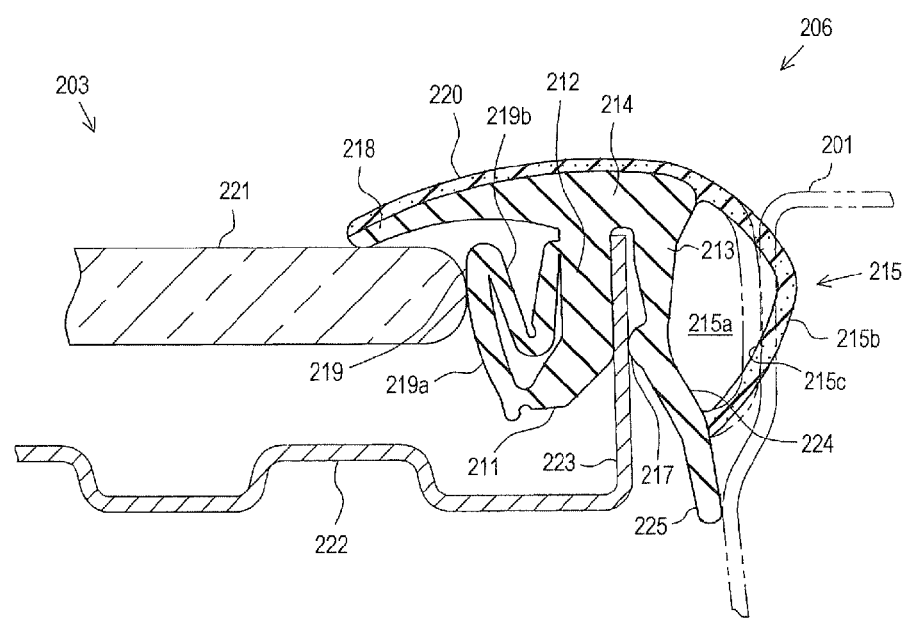
FIG. 25 is a cross-sectional view illustrating a weather strip which is mounted on a sliding loop.

As shown in FIG. 25, the sliding loop 203 includes a flat glass panel 221 and a-shaped frame 222 provided on the circumference of the glass panel 221. In addition, the circumferential edge of the sliding loop 2003 is provided with a flange portion 223 by bending and returning the end of the frame 222 toward the vehicle outer side. By fitting the flange portion 223 into the trim portion 211, the weather strip 205 is held at the circumferential edge of the sliding loop 203. In this instance, the vehicle outer sealing lip 218 is pressed against the vehicle outer upper surface of the glass panel 221, and the vehicle inner sealing lip 219 is pressed against the circumferential portion of the glass panel 221. In this way, a gap between the glass panel 221 and the frame 222 is sealed.

In addition, when the sliding loop 203 is closed, the sealing surface of the sealing wall 215b of the hollow sealing portion 215 is pressed against the circumferential edge of the loop panel opening 202, and thus is distorted and deformed (refer to the chain double-dashed line in FIG. 25), so that the gap between the sliding loop 203 and the loop panel 201 is sealed.

Further, the end of the sealing wall 215b is connected to the extrusion molded portion 206 at a boundary position between the dewatering lip 225 and the extension base portion 224. For this reason, under the existence of the dewatering lip 225, it is possible to prevent water such as rainwater, which flows along the surface of the sealing wall 215, from dropping onto a drip groove of the loop panel 201 from the front end of the dewatering lip 225 and entering the automobile.

Figure 26:
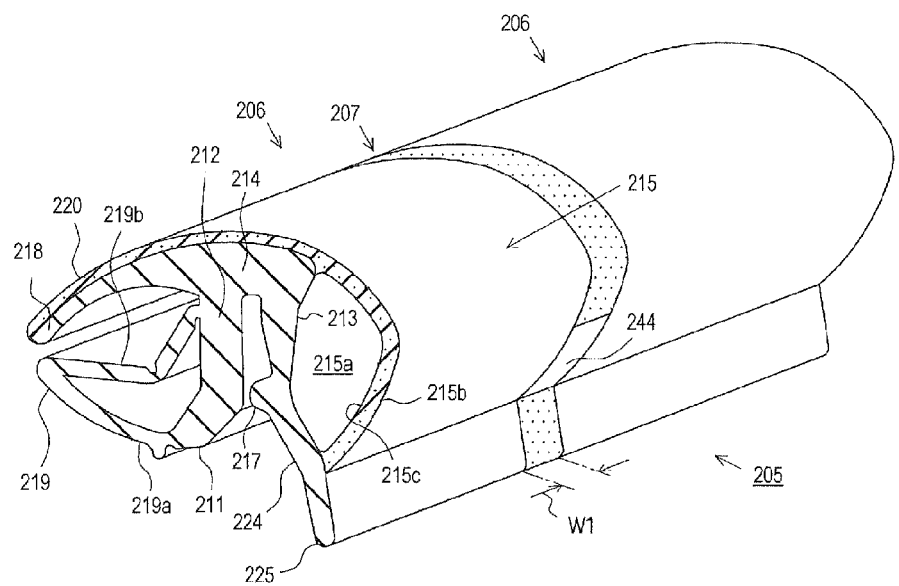
FIG. 26 is a perspective view illustrating an injection molded portion of a weather strip.
Figure 27:
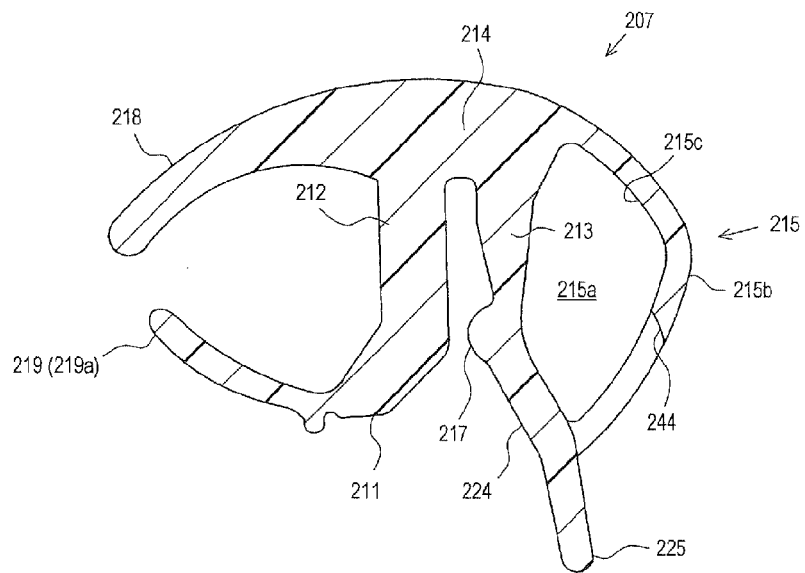
FIG. 27 is a cross-sectional view taken along the line K-K in FIG. 23 illustrating a weather strip.
Figure 28:
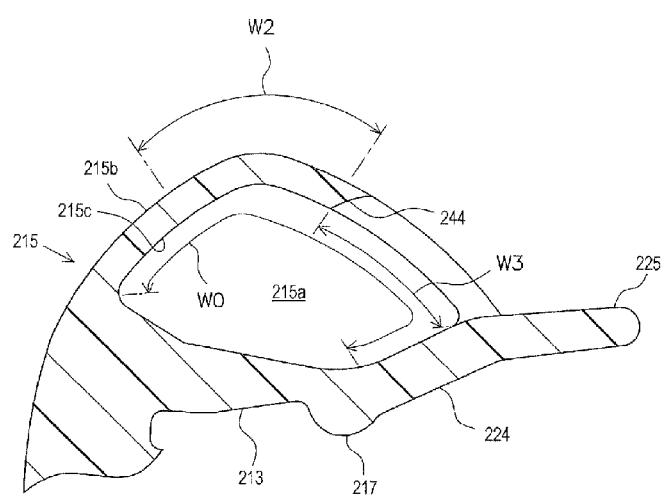
FIG. 28 is a partially enlarged cross-sectional view illustrating a hollow sealing portion or the like of an injection molded portion.

Meanwhile, the injection molded portion 207 is formed such that a connecting width W1 is 2.0 mm in the longitudinal direction (left and right direction in FIG. 26) of the weather strip, as shown in FIG. 26. The injection molded portion 207 basically has substantially the same sectional shape as that of the extrusion molded portion 206, as shown in FIG. 27, and includes the trim portion 211 and the hollow sealing portion 215. The injection molded portion 207 is very different from the extrusion molded portion 206 in that the overall thereof is made from thermoplastic vulcanizates (TPV) of 40 IRHD (International rubber Hardness Degrees), and that the sub lip 219b and the sheath layer 220 are not provided.

In addition, the injection molded portion 207 is provided with a core withdrawing hole 244 through a core mold member 258 (refer to FIG. 29) for forming the inner peripheral surface 215c (hollow portion 215a) of the hollow sealing portion 215 of the injection molded portion 207 is withdrawn after molding, as shown in FIGS. 26 to 29. Further, the core withdrawing hole 244 is provided in the sealing wall 215b adjacent to the dewatering lip 225, thereby not forming a portion, that is, rainwater is hardly gathered in the hollow portion 215a. Further, while the core mold member 258 will be described below in detail, the term "member" will be omitted in the description for others mold member, as well as the core mold member 258.

The core withdrawing hole 244 is formed at the portion of the sealing wall 215b of the hollow sealing portion 215, which is positioned at a lower side (vehicle inner) in the state in which it is mounted on the sliding loop 203, over a region of the hollow sealing portion except for a region W2 serving as a sealing surface which is pressed against the circumferential edge of the loop panel opening 202.

The core withdrawing hole 244 is set over the whole region (2.0 mm in width) of the injection molded portion 207 in the longitudinal direction of the weather strip, and is set such that the length W3 of the inner peripheral surface 215c of the hollow sealing portion 215 in the circumferential direction is 30% of the circumferential length W0 (refer to FIG. 28) of the inner peripheral surface 215c. In addition, the inner peripheral surface 215c of the hollow sealing portion 215 is formed by an inner surface of the sealing wall 215b and an outer surface of the extension base portion 224.

Figure 29:
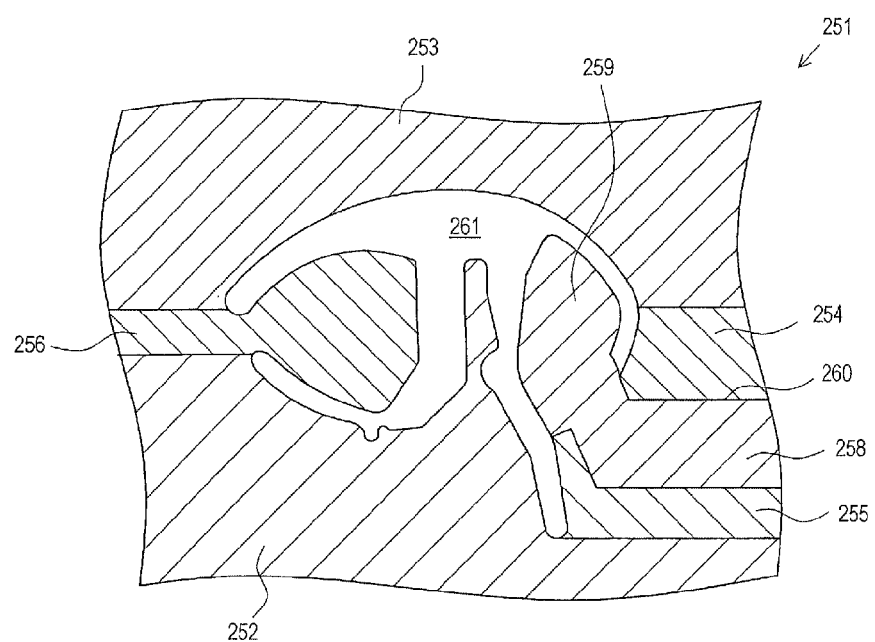
FIG. 29 is a cross-sectional view illustrating a molding device for forming an injection molded portion.

The molding device 251 for molding the injection molded portion 207 will now be described. FIG. 29 is a cross-sectional view illustrating the molding device 251 used for molding the injection molded portion 207. The molding device 251 includes, for example, a stationary mold 252 positioned at the lower portion in the drawing, and a plurality of movable molds (a first movable mold 253, a second movable mold 254, a third movable mold 255, and a fourth movable mold 256). Further, a core mold 258 is provided between the second movable mold 254 and the third movable mold 255. The first to fourth movable molds 253 to 256 are provided to be relatively moved with respect to the stationary mold 252 by a cylinder (not illustrated) or the like. In addition, after the first movable mold 253, the second movable mold 254 and the fourth movable mold 256 are moved with respect to the stationary mold 252, the third movable mold 255 and the core mold 258 are moved from the stationary mold 252. The third movable mold 255 is moved to be away from the core mold 258, and the molding is finally detached from the core mold 258.

The core mold 258 has a core body 259 and a holding portion 260 integrally extending from the core body 259.

Figure 31:
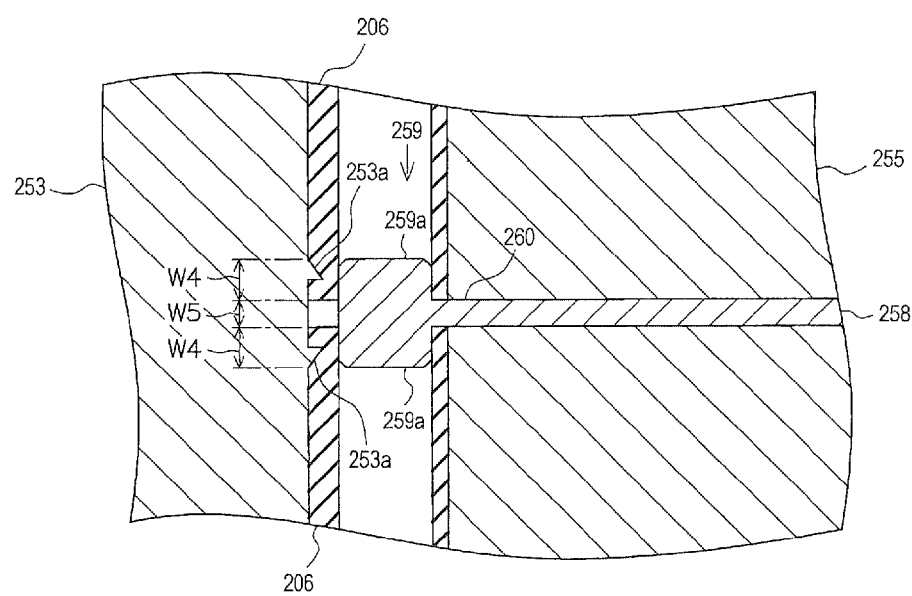
FIG. 31 is a cross-sectional view illustrating various molds in a state in which an extrusion molded portion is fitted.

The core body 259 is set such that the length W4 of an inserting portion 259a inserted into the hollow sealing portion 215 is 3.0 mm and the thickness W5 of the holding portion 260 is 2.0 mm, as shown in FIG. 31.

The stationary mold 252 and the respective movable molds 253 to 256 are provided with a molding surface corresponding to an outer appearance shape of the injection molded portion 207. In addition, the core body 259 is for forming the inner peripheral surface 215c (hollow portion 215a) of the hollow sealing portion 215, and is installed in the center of the space enclosed by the stationary mold 252 and the respective movable molds 253 to 256. A cavity 261 (refer to FIG. 29) is formed by these molding surfaces and the outer surface of the core body 259 to mold the injection molded portion 207.

As shown in FIG. 31, the first movable mold 253 is provided with a pair of locking protrusions 253a for locking the extrusion molded portion 206, which is fitted into the inserting portion 259a, at the position opposite to the outer peripheral surface of the inserting portion 259a of the core body 259. The pair of locking protrusions 253a is formed such that the sectional shapes thereof in the longitudinal direction (upward and downward direction in FIG. 31) of the weather strip are respectively formed in a right triangle, and the surfaces perpendicular to the molding surface of the first movable mold 253 are respectively formed opposite each other. In addition, the second movable mold 254 is provided with the same locking protrusions which are not shown.

Next, a method for producing the weather strip 205 including the above-described configuration, and operation effects obtained in the production will be described.

First, the extrusion molded portion 206 is molded through a known injection molding method by using an injection molding device (not illustrated). The extrusion molded portion 206 is cut to have a determined length in accordance with the circumferential length of the flange portion 223 of the sliding loop 203 to be mounted.

Then, both ends of the extrusion molded portions 206 are connected to each other by the injection molded portion 207. More specifically, in the state in which each of the molds 252 to 256 and so forth are opened, the elongated extrusion molded portion 206 is bent, and the hollow sealing portion 215 is fitted to both ends of the core body 259 of the core mold 258 in the longitudinal direction (upward and downward direction in FIG. 31) such that both ends thereof face each other. The movable molds 253 to 256 and the core mold 258 are set and clamped at a predetermined position with respect to the stationary mold 252. In this way, the extrusion molded portion 206 is mounted and fixed to the molding device 251 to form the cavity 261, as shown in FIG. 29.

If the clamping is completed, as shown in FIG. 31, the extrusion molded portion 206 fitted into the core body 259 is under the state in which both ends thereof are opposite to each other at an interval of the connecting width W1 (2.0 mm) of the injection molded portion 207, and it prevents the releasing of the extrusion molded portion 206 from the core body 259 by the locking protrusions 253a of the first movable mold 253 or the like.

In addition, in the clamped state, the third movable mold 255 abuts the lateral surface of the core body 259, as shown in FIG. 29, and abuts the lower surface of the holding portion 260 which is consecutive to the lower surface of the core body 259.

Figure 30:
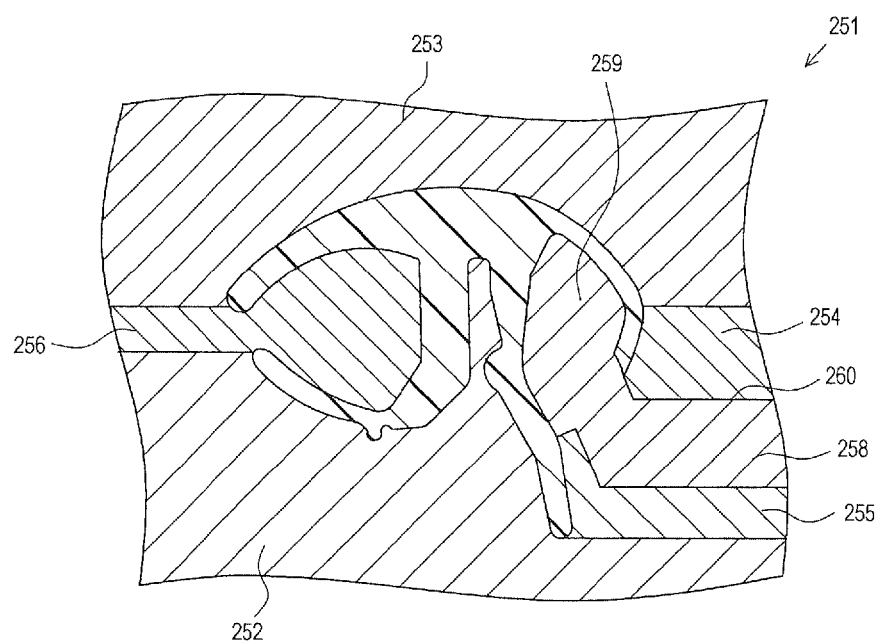
FIG. 30 is a cross-sectional view of a molding device illustrating a state in which a cavity is filled with a material.

From this state, the cavity 261 is introduced and filled with a plasticized TPV through a gate (not illustrated), as shown in FIG. 30. After that, the TPV is solidified. At that time, the hollow sealing portion 215 of the injection molded portion 207 is provided with core withdrawing hole 244 due to the presence of the holding portion 260 and the third movable mold 255 which abuts the holding portion 260.

After the solidification of TPV, the movable molds 253 to 256 are sequentially opened in reverse order of mold clamping, and the formed injection molded portion 207 is released from the stationary mold 252 together with the core mold 258.

In this step, the core body 259 is exposed at the portion in which the core body 259 is spaced apart from the third movable mold 255. That is, a portion of the core withdrawing hole 244 is opened.

Next, the holding portion 260 is held in the state in which injection molded portion 207 is separately supported, and the core body 259 is withdrawn from the core withdrawing hole 244 by withdrawing it from the hollow sealing portion 215. In this way, the hollow portion 115a is formed in the hollow sealing portion 215.

In this way, the weather strip 205 of an annular shape is obtained in which both ends of the extrusion molded portion 206 are connected to each other by the injection molded portion 207.

As described in detail above, according to the third embodiment, the injection molded portion 207 itself is provided with the core withdrawing hole 244 through which the core mold 258 used to form the hollow sealing portion 215 of the injection molded portion 207 is withdrawn after molding.

For this reason, the process of forming the core withdrawing hole in advance in the extrusion molded portion 206 is not necessary. Further, it is not necessary to use a sheet material or the like specially for connecting the extrusion molded portion 206. As a result, it is possible to suppress the decrease in the productivity or the increase in the cost.

Moreover, since the hollow sealing portion 215 is not clogged by the sheet material, there is no concern that a load applied when the sliding loop 203 is closed may be locally increased in the vicinity of the connecting portion. Further, a stepped portion is hardly formed between the injection molded portion 207 and the extrusion molded portion 206, and it is possible to suppress the decrease in the sealing capability.

Since the connecting width W1 of 0.2 mm of the injection molded portion 207 is relatively narrow, and thus the opening area of the core withdrawing hole 244 opened there is relatively small, the injection molded portion 207 and the core withdrawing hole 244 hardly stick out. As a result, it looks highly attractive, and the quality of the appearance is improved.

In addition, since the opening area of the core withdrawing hole 244 is relatively small, even though there is no support lip for closing the core withdrawing hole 244 while supporting the hollow sealing portion 215 when the sliding loop 203 is closed, a load difference applied when the sliding loop 203 is closed is not increased between the injection molded portion 207 and the extrusion molded portion 206 in the vicinity of the injection molded portion. Further, it is not necessary to provide a support lip or the like which interferes in the core withdrawing operation. In addition, since the core withdrawing hole 244 is provided in the vicinity of the dewatering lip 225, rainwater or the like is not gathered in the hollow portion 215a.

As the width of 2.0 mm of the core withdrawing hole 244 in the longitudinal direction of the weather strip is set to be relatively narrow, since the length W3 of the inner peripheral surface 215c of the hollow sealing portion 215 in the circumferential direction is set to be relatively long such that it is 30% of the circumferential length W0 of the inner peripheral surface 215c, there is no concern that it may be difficult to carry out the core withdrawing operation.

As a result, with the weather strip 205 according to the third embodiment and the production method thereof, it is possible to easily withdraw the core mold 258, without causing a decrease in a quality of an appearance or a sealing capability thereof.

In addition, the first movable mold 253 or the like is provided with the pair of locking protrusions 253a for locking the extrusion molded portion 206 which is fitted into the core body 259. In this way, it is possible to reduce the concern that the extrusion molded portion 206 is deviated from the core body 259 by an ejection pressure when the material is extruded into the cavity 261.

Further, since the injection molded portion 207 is made from the TPV of 40 IRHD which has a viscosity lower than a rubber material such as EPDM or the like and does not require for vulcanization, it is possible to reduce the concern that the extrusion molded portion 206 may be deviated from the core body 259 by the ejection pressure of the material.

As a result, as compared with the molding case using the rubber material, it is possible to shorten the region holding the extrusion molded portion 206. In addition, as in the third embodiment, as the length W4 of the inserting portion 259a of the core body 259 is set to 3.0 mm, since the inserted quantity of the core body 259 into the extrusion molded portion 206 can be reduced, it is possible to shorten the length of the core body 259 and thus to form the core withdrawing hole 244 so as to be relatively small.

In addition, by using TPV, a trace locked by the locking protrusion 253a or the like is hardly to be left on the extrusion molded portion 206, without leaving a trace, which is formed by a hot mold when the rubber material is vulcanized, on the extrusion molded portion 206. Further, by using the TPV, it is possible to eliminate the vulcanizing process.

As a result, the core withdrawing operation becomes easy, and it is possible to improve the productivity and the quality of the appearance.

In addition, a portion of the core withdrawing hole 244 is formed by the third movable mold 255 abutting the core mold 258, as well as the holding portion 260 of the core mold 258. That is, the core withdrawing hole 244 is formed to be longer than the width of the holding portion 260 in the circumferential direction of the hollow sealing portion 215. In this way, since the core withdrawing hole 244 is opened further widely with respect to the longitudinal direction of the weather strip, it is possible to easily carry out the core withdrawing operation.

In addition, the present invention is not limited to the description of the third embodiment, and can be implemented, for example, by the following. Of course, other applications and modifications which are not illustrated in the drawings can be achieved.

(a) In the third embodiment, the present invention is embodied by the weather strip 205 which is mounted on the circumferential edge of the sliding loop 203 serving as a movable loop, but it is not limited thereto, and can be embodied by another weather strips which can be mounted on a circumferential edge of other movable loop, for example, a tilting type movable loop, which can open and close the loop panel opening.

(b) In the third embodiment, the connecting width W1 of the injection molded portion 207 in the longitudinal direction of the weather strip is set to 2.0 mm, but it is not limited thereto. If the connecting width W1 of the injection molded portion 207 is set to less than 0.5 mm, the holding portion 260 of the core mold 258 needs to be very thin, and thus it is difficult to obtain the strength of the core mold 258, so that the durability of the molding device 251 may be deteriorated. Meanwhile, if the connecting width W1 of the injection molded portion 207 is more than 3.0 mm, it will look unattractive. Accordingly, it is desirable that the connecting width W1 of the injection molded portion 207 is set to 0.5 mm or more and 3.0 mm or less.

(c) In the third embodiment, the length W3 of the core withdrawing hole 244 along the circumferential direction of the inner peripheral surface 215c of the hollow sealing portion 215 is 30% of the circumferential length W0 of the inner peripheral surface 215c, but the length W3 of the core withdrawing hole 244 is not limited thereto. If the length W3 of the core withdrawing hole 244 is less than 15% of the circumferential length of the inner peripheral surface 215c of the hollow sealing portion 215, there is a concern that the core body 259 may not be easily withdrawn, and the circumferential edge of the core withdrawing hole 244 may be broken. Meanwhile, if the length W3 of the core withdrawing hole 244 is more than 45% of the circumferential length W0 of the inner peripheral surface 215c of the hollow sealing portion 215, it is difficult to secure the sealing surface or prevent the water from entering. Accordingly, it is desirable that the length W3 of the core withdrawing hole 244 is set to be 15% or more and 45% or less of the circumferential length W0 of the inner peripheral surface 215c of the hollow sealing portion 215. In addition, in the case where the sealing wall 215b is provided with the core withdrawing hole 244, it is desirable that the length W3 is set to be 25% or more and 40% or less of the circumferential length W0 of the inner peripheral surface 215c.

(d) In the third embodiment, the injection molded portion 207 is made from TPV, but it is not limited to such a configuration. For example, the injection molded portion may be made from other materials such as uncross-linked olefin-based thermoplastic elastomer (TPO). In addition, TPV having hardness of 20 to 60 IRHD can be used.

Figure 32:
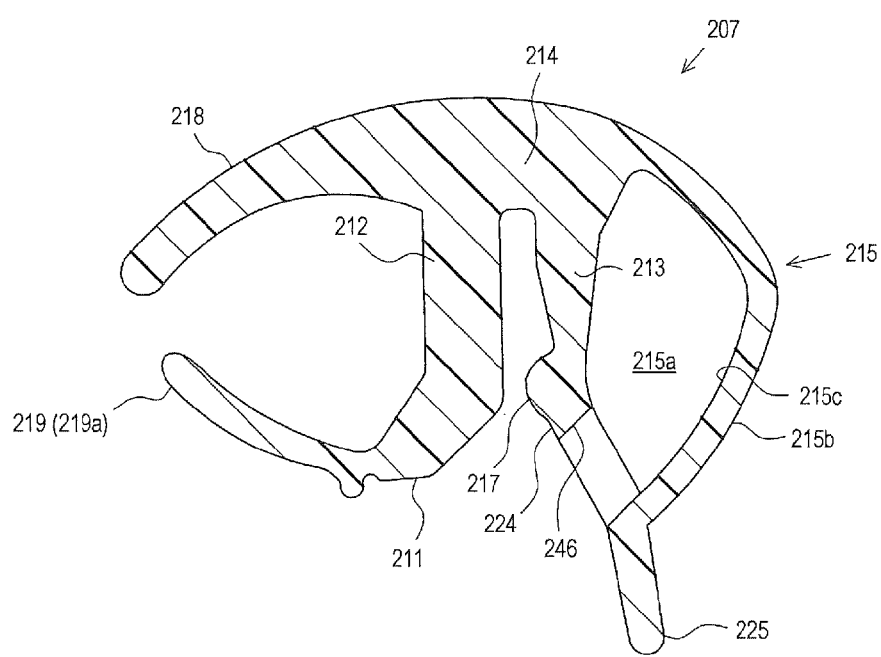
FIG. 32 is a cross-sectional view illustrating an injection molded portion of a weather strip according to another embodiment.

(e) In the third embodiment, the core withdrawing hole 244 is formed in the lower portion of the hollow sealing portion 215 in the state in which it is mounted on the sliding loop 203. The formation position of the core withdrawing hole 244 is not limited thereto. For example, as shown in FIG. 32, the extension base portion 224 is provided with the core withdrawing hole 246. In this way, the core withdrawing hole 246 can be concealed from view. Even though the injection molded portion 207 is provided with the core withdrawing hole 246, it is possible to prevent the decrease in the sealing capability of the weather strip 205 or the quality of the appearance.

Figure 33:
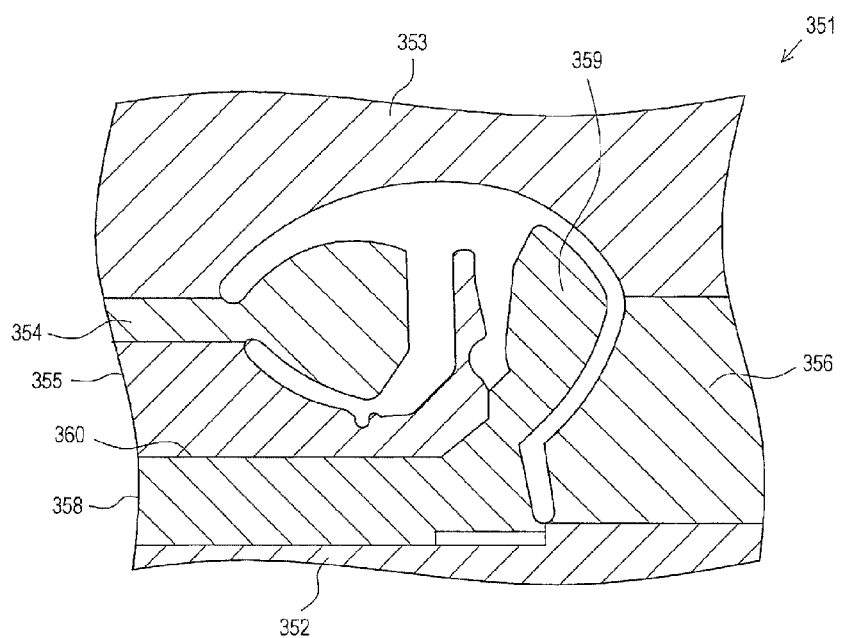
FIG. 33 is a cross-sectional view illustrating a molding device for molding an injection molded portion of a weather strip according to another embodiment.

In addition, as the molding device used to form the injection molded portion 207 shown in FIG. 32, for example, the molding device 351 shown in FIG. 33 is exemplified. The molding device 351 includes a stationary mold 352 positioned at the lower side in the drawing, and a plurality of movable molds (a first movable mold 353, a second movable mold 354, a third movable mold 355, and a fourth movable mold 356). In addition, a core mold 358 is provided between the stationary mold 352 and the third movable mold 355. The core mold 358 has a core body 359 and a holding portion 360 extending integrally from the core body 359.

(f) In the third embodiment, the first movable mold 253 is provided with the pair of locking protrusions 253a for locking the extrusion molded portion 206, which is fitted into the inserting portion 259a of the core body 259, in which the pair of locking protrusions 253a is formed of the right triangle in a cross section. The configuration of the locking protrusions 253a is not limited to the third embodiment. For example, it can employ an isosceles triangle in a cross section or a quadrangle in a cross section. In order to prevent the extrusion molded portion 206 from being released, as in the third embodiment, it is desirable that it has surfaces perpendicular to the opposite surfaces of the pair of the locking protrusions in the longitudinal direction of the weather strip. In addition, a configuration in which the locking protrusions 253a are omitted is possible.

Further, the core body 259 side may be provided with the locking protrusion. In this instance, since the core body 259 is enlarged, it is difficult to carry out the core withdrawing operation. Also, there is a concern that the circumferential edge of the core withdrawing hole 244 may be broken by the locking protrusion during the core withdrawing operation. Therefore, it is more desirable that the locking protrusion is provided at the first movable mold 253 or the like opposite to the core body 259.

(g) In the third embodiment, at the injection molding, a portion of the core withdrawing hole 244 is formed by the second movable mold 255 abutting the holding portion 260, as well as the holding portion 260 of the core mold 258, but it is not limited thereto. The core withdrawing hole 244 may be formed only by the holding portion 260 of the core mold 258.

(h) In the third embodiment, the lower end of the outer-peripheral-side sidewall portion 213 is connected to the lower end of the sealing wall 215b by the extension base portion 224. In the case where the cross section of the hollow portion 215a is small, the extension base portion 224 may be omitted, and the lower end of the outer-peripheral-side sidewall portion 213 can be directly connected to the lower end of the sealing wall 215b, or the dewatering lip 225 can extend from the connecting portion. In addition, in this instance, the core withdrawing hole 244 is provided in the sealing wall 215b.

(i) In the third embodiment, while being not specifically mentioned herein, in order to prevent the hollow portion 215a from being distorted in a corner portion of the weather strip 205, a pad may be inserted into the hollow portion 215a of the corner portion.

What is claimed is:

1. A method for producing a weather strip including:
an extrusion molded portion;
an injection molded portion which is formed by a molding device having a plurality of mold members and connects one end of the extrusion molded portion in a longitudinal direction of the weather strip and one end of an adjacent extrusion molded portion in the longitudinal direction of the weather strip in a straight line shape;
a mounting base portion which is mounted on a circumferential edge of an opening of a body or a circumferential edge of an opening/closing member for opening and closing the opening; and
a hollow sealing portion which protrudes from the mounting base portion, and is pressed against an opposite member when the opening/closing member for opening and closing the opening is closed,
wherein in a core mold member having a core body for forming an inner peripheral surface of a hollow sealing portion of the injection molded portion, and a holding portion protruding from the core body, in a state in which both ends of the core body in a longitudinal direction of the core body are inserted into a terminal of the hollow sealing portion of the extrusion molded portion when the injection molded portion is formed, the core mold member is positioned at a predetermined position of the molding device such that a connecting width of the injection molded portion in the longitudinal direction of the weather strip is 0.5 mm or more and 3.0 mm or less, the mold member is closed to form a cavity in the molding device, and the cavity is filled with a material of the injection molded portion to form the injection molded portion;
the injection molded portion is provided with a core withdrawing hole, through which the core body is withdrawn by at least the holding portion after the core body is formed, such that a length thereof along a circumferential direction of the inner peripheral surface of the hollow sealing portion is 25% or more and 45% or less of a circumferential length of the inner peripheral surface in a region of the hollow sealing portion except for a sealing surface which is pressed against the opposite member; and
after the injection molded portion is formed and the mold member of the molding device is opened, the core body is withdrawn from the core withdrawing hole, and
wherein among the plurality of mold members, a predetermined mold member opposite to an outer peripheral surface of the core body is provided with a locking protrusion for locking the extrusion molded portion in a state in which both ends of the core body in the longitudinal direction of the core body are inserted into the terminal of the hollow sealing portion of the extrusion molded portion.

2. The method for producing the weather strip according to claim 1, wherein a material of the injection molded portion comprises an olefin-based thermoplastic elastomer of 40 IRHD.

3. The method for producing the weather strip according to claim 1, wherein the injection molded portion is disposed such that a predetermined mold member among the plurality of mold members abuts one side of the holding portion in the circumferential direction of the hollow sealing portion and also abuts the core body, and after the cavity is filled with the material, the predetermined mold member is relatively spaced apart from the core mold member to form a portion of the core withdrawing hole.

4. The method for producing the weather strip according to claim 1, wherein the weather strip includes a trim portion which is different than the mounting base portion and is mounted on a circumferential edge of a door opening of the body, and a hollow sealing portion which protrudes from a vehicle outer sidewall portion of the trim portion, and is pressed against the circumferential edge of the door when the door for opening and closing the door opening is closed, and at the time of forming the injection molded portion, the core withdrawing hole, through which the core body is withdrawn by at least the holding portion after the forming of the injection molded portion.

5. The method for producing the weather strip according to claim 1, wherein the weather strip includes the mounting base portion which is mounted on a circumferential edge of a movable roof for opening and closing a roof panel opening of the body, and a hollow sealing portion which protrudes from the mounting base portion, and has a sealing wall which is pressed against the circumferential edge of the roof panel opening when the movable roof is closed, and at the time of forming the injection molded portion, the core withdrawing hole, through which the core body is withdrawn by at least the holding portion after the forming of the injection molded portion, is formed such that the length thereof along the circumferential direction of the inner peripheral surface of the hollow sealing portion is 25% or more and 45% or less of the circumferential length of the inner peripheral surface in the region of the hollow sealing portion except for the sealing surface which is pressed against the circumferential edge of the roof panel opening.

* * * * *